United States Patent
Chennakeshu et al.

(10) Patent No.: US 6,327,317 B1
(45) Date of Patent: Dec. 4, 2001

(54) COMBINED EQUALIZATION AND DECODING TECHNIQUES

(75) Inventors: Sandeep Chennakeshu, Cary; Ravinder David Koilpillai, Apex, both of NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/393,881

(22) Filed: Sep. 10, 1999

(51) Int. Cl.[7] .............................. H03D 1/00; H04L 27/06
(52) U.S. Cl. ........................ 375/341; 375/262; 714/795
(58) Field of Search ................................. 375/341, 262, 375/265; 714/792, 794, 795

(56) References Cited

U.S. PATENT DOCUMENTS 5,263,053 * 11/1993 Wan et al. ............................ 375/285
6,038,269 * 3/2000 Raghavan .............................. 375/340

FOREIGN PATENT DOCUMENTS

0550143A2 7/1993 (EP).
0889612A2 1/1999 (EP).

OTHER PUBLICATIONS

Yongbing Wan, et al., "A Fractionally–Spaced Maximum–Likelihood Sequence Estimation Receiver in a Multipath Fading Environment", Proceedings of the International Conference on Acoustics, Speech and Signal Processing (ICASSP), U.S., New York, IEEE, vol. Conf. 17, 1992, pp. IV–689–IV–692.

Yow–Jong Liu, "Bi–directional Equalization Technique for TDMA Communication Systems over Land Mobile Radio Channels", Proceedings of the Global Telecommunications Conference (Globecom), U.S., New York, IEEE, 1991, pp. 1458–1462.

H. Imai, et al., "A New Multi–Level Coding Method Using Error Correcting Codes" IEEE Transactions on Information Theory, vol. IT–23, pp. 371–377 plus Errata sheet, May 1997.

S. Sayegh, "A class of optimum block codes in signal space," *IEEE Transactions on Communications*, vol. COM–34, pp. 1043–1045, Oct. 1986.

(List continued on next page.)

*Primary Examiner*—Chi Pham
*Assistant Examiner*—Phuong Phu
(74) *Attorney, Agent, or Firm*—Burns, Doane, Swecker & Mathis, L.L.P.

(57) ABSTRACT

Combined equalization and decoding of codewords in a coded modulation symbol sequence that has been received from a channel is accomplished in a number of ways. In an intersymbol interference (ISI) cancellation technique, channel impulse response (CIR) estimates corresponding to each received symbol of the coded modulation symbol sequence are determined. Codeword k of the received symbol sequence is then decoded using a maximum likelihood decoding trellis with a path metric that depends upon the CIR estimates and that includes at least one term representing intersymbol interference resulting from symbols of previously decoded codewords. The decoding step is repeated until all of the codewords of the received coded modulation symbol sequence have been decoded. In a maximum likelihood sequence estimation (MLSE)-based technique, an MLSE trellis is advanced from one stage to a next stage by updating a path metric having dependence on the CIR estimates and upon symbols of a codeword corresponding to a state in a previous trellis stage. The trellis-advancing step is repeated until all stages of the MLSE trellis are completed. Then, the codewords are decoded by using a traceback along the best path in the completed MLSE trellis. In another embodiment, a hybrid MLSE-ISI technique utilizes a path metric that depends upon the CIR estimates and upon symbols of a codeword corresponding to a state in a previous trellis stage. The path metric further includes at least one term that represents intersymbol interference resulting from symbols of previously decoded codewords.

44 Claims, 8 Drawing Sheets

OTHER PUBLICATIONS

A.R. Calderbank, "Multi-level codes and multi-stage decoding," *IEEE Transactions on Communications*, vol. COM–37, pp. 222–229, Mar. 1989.

N. Seshadri and C.-E. W. Sundberg, "Coded modulation with time diversity, unequal error protection and low delay for the Rayleigh fading channel," Proceedings of First Universal Conference on Portable and Mobile Communications, pp. 283–287, Sep. 1992.

N. Seshadri and C.-E. W. Sundberg, "Multi-level block coded modulations with unequal error protection for the Rayleigh fading channel," European Transactions on Communications, vol. 4, pp. 325–334, May 1993.

Y. Liu, "Performance of adaptive equalization and soft decision decoding techniques over TDMA digital cellular radio channels," Proceedings of IEEE Globecom '92, pp. 27.6.1–27.6.5, Dec. 1992.

R. Mehlan and H. Meyr, "Combined equalization/decoding of trellis coded modulation on frequency–selective fading channels," *Proc. of the Fifth Terrenia International Workshop on Digital Communications* (E. Biglieri and M. Luise, eds.), pp. 341–352, Elsevier Science Publishers B.V., 1992.

S.A. Fechtel and H. Meyr, "A new mobile radio transceiver concept using low–complexity combined equalization/trellis decoding and a near–optimal receiver sync strategy," Proceedings of IEEE PIMRC '92, pp. 382–386, Oct. 1992 [9,10].

S. A. Fechtel and H. Meyr, "Combined equalization, decoding and antenna diversity combining for mobile/personal digital radio transmission using feedforward synchronization," Proceedings of IEEE VTC '93, pp. 633–636, May. 1993.

N.W.K. Lo, D.D. Falconer, and A.U.H. Sheikh, "Adaptive equalization and diversity combining for a mobile radio channel," Proceedings of IEEE Globecom '90, pp. 507A.2.1–507A.2.5, Dec. 1990.

N.W.K. Lo, D.D. Falconer, and A.U.H. Sheikh, "Channel interpolation for digital mobile radio communications," Proceedings of IEEE International Conference on Communications (ICC 91), pp. 25.3.1–25.3.5, Jun. 1991.

R.D. Koilipillai, S. Chennakeshu, and R.L. Toy, "Equalizer performance with diversity for U.S. digital cellular," in Proceedings of IEEEE PIMRC '92, pp. 255–258, Oct. 1992.

J. Wolf, "Efficient maximum likelihood decoding of linear block codes using a trellis," IEEE Transactions on Information Theory, vol. IT–24, pp. 76–80, Jan. 1978.

G.D. Forney, "The Viterbi algorithm," Proceedings of the IEEE, vol. 61, pp. 268–278, Mar. 1973.

N. Seshadri and C.W. Sundberg, "Generalized Viterbi detection with convolutional codes," Proceedings of IEEE Globecom '89, pp. 1534–1538, Nov. 1989.

G.D. Forney, "Maximum–likelihood sequence estimation of digital sequences in the presence of intersymbol interference," IEEE Transactions in Information Theory, vol. IT–18, pp. 363–378, May 1972.

S. Chennakeshu, R.D. Koilpillai, and R.L. Toy, "A low complexity MLSE equalizer for U.S. Digital Cellular mobile receivers," *G.E. Technical Information Series*, Dec. 1991, GE–CRD Technical Report (Class 2) 91CRD247.

Y. Liu, "Bi–directional equalization for TDMA communication systems over land mobile radio channels," Proceedings of IEEE Globecom '91, pp. 41.1.1.–41.1.5, Dec. 1991.

Y. Wan, Q. Liu, and A.M. Sendyk, "A fractionary–spaced maximum likelihood sequence estimation receiver in a multipath fading environment," Proceedings of IEEE ICASSP '92, pp. 689–692, May 1992.

* cited by examiner

COMBINED EQUALIZATION AND DECODING TECHNIQUES

BACKGROUND

The present invention relates to coded modulation techniques, and more particularly to techniques for performing equalization and decoding in a communications system that utilizes coded modulation.

The concept of multi-level coding or block coded modulation (BCM) was introduced in H. Imai and S. Hirakawa, "A new multi-level coding method using error correcting codes," *IEEE Transactions on Information Theory*, vol. IT-23, pp. 371–377, May 1977; S. Sayegh, "A class of optimum block codes in signal space," *IEEE Transactions on Communications*, vol. COM-34, pp. 1043–1045, October 1986; and A. R. Calderbank, "Multi-level codes and multi-stage decoding," *IEEE Transactions on Communications*, vol. COM-37, pp. 222–229, March 1989. Recent publications have demonstrated that BCM is an attractive approach for combining modulation and coding for Rayleigh fading channels. Such publications include N. Seshadri and C.-E. W. Sundberg, "Multi-level coded modulations for fading channels," *Proceedings of the Fifth Tirennia International Workshop on Digital Communications* (E. Biglieri and M. Luise, eds.), pp. 341–352, Elsevier Science Publishers B.V., 1992; N. Seshadri and C.-E. W. Sundberg, "Coded modulation with time diversity, unequal error protection and low delay for the Rayleigh fading channel," *Proceedings of First Universal Conference on Portable and Mobile Communications*, pp. 283–287, September 1992; and N. Seshadri and C.-E. W. Sundberg, "Multi-level block coded modulations with unequal error protection for the Rayleigh fading channel," *European Transactions on Communications*, vol. 4, pp. 325–334, May 1993. One of the main issues in evaluating the applicability of BCM to the North American TDMA cellular standard (IS-136) or to similar wireless radio applications is the issue of equalization, which is necessitated by the delay spread of the channel.

The conventional approach for equalization of coded modulation systems is to perform the equalization and decoding as two independent steps with soft information being passed from the equalizer to the decoder. Such a technique is described in Y. Liu, "Performance of adaptive equalization and soft decision decoding techniques over TDMA digital cellular radio channels," *Proceedings of IEEE GLOBECOM '92*, pp. 27.6.1–27.6.5, December 1992.

By performing combined equalization (demodulation) and decoding it is possible to eliminate the step of soft information generation. Unless soft information generation is accurate, there is the potential for information loss and subsequent loss in decoder performance. In this sense, combined equalization and decoding is closer to optimal.

A combined equalization and decoding technique was described for trellis coded modulation (TCM) systems in R. Mehlan and H. Meyr, "Combined equalization/decoding of trellis coded modulation on frequency-selective fading channels," *Proc. of the Fifth Tirrenia International Workshop on Digital Communications* (E. Biglieri and M. Luise, eds.), pp. 341–352, Elsevier Science Publishers B.V., 1992. The algorithm has been developed further in S. A. Fechtel and H. Meyr, "A new mobile radio transceiver concept using low-complexity combined equalization/trellis decoding and a near-optimal receiver sync strategy," *Proceedings of IEEE PIMRC '92*, pp. 382–386, October 1992 [9, 10]; and in S. A. Fechtel and H. Meyr, "Combined equalization, decoding and antenna diversity combining for mobile/personal digital radio transmission using feedforward synchronization," *Proceedings of IEEE VTC '93*, pp. 633–636, May 1993, and has been applied to the European GSM system.

The novel techniques disclosed herein improve upon the performance of the above disclosed techniques.

In order to perform equalization in a Rayleigh fast-fading environment, it is essential that the channel impulse response (CIR) variation over the entire slot be estimated accurately. One of the approaches that has been successfully demonstrated for CIR estimation is interpolation of the CIR using the initial estimates obtained over the training periods. This approach has been described in N. W. K. Lo, D. D. Falconer, and A. U. H. Sheikh, "Adaptive equalization and diversity combining for a mobile radio channel," *Proceedings of IEEE GLOBECOM '90*, pp. 507A.2.1–507A.2.5, Dec. 1990; N. W. K. Lo, D. D. Falconer, and A. U. H. Sheikh, "Channel interpolation for digital mobile radio communications," *Proceedings of IEEE International Conference on Communications* (ICC 91), pp. 25.3.1–25.3.5, June 1991; and in R. D. Koilpillai, S. Chennakeshu, and R. L. Toy, "Equalizer performance with diversity for U.S. digital cellular," in *Proceedings of IEEE PIMRC '92*, pp. 255–258, October 1992.

SUMMARY

It is an object of the present invention to provide a combined equalization and decoding algorithm that is tailored for BCM with the CIR estimation being done via CIR interpolation.

In accordance with one aspect of the present invention, the foregoing and other objects are achieved in methods and apparatus for performing combined equalization and decoding of codewords encoded in a block coded modulation (BCM) symbol sequence that has been received from a channel, wherein each of the codewords comprises a plurality of symbols. In one embodiment, this is accomplished by determining channel impulse response estimates corresponding to each received symbol of the BCM symbol sequence. A codeword of the received BCM symbol sequence is then decoded using a maximum likelihood decoding trellis with a path metric that depends upon the channel impulse response estimates and that includes at least one term representing intersymbol interference resulting from one or more symbols of one or more previously decoded codewords. The decoding step is then repeated until all of the codewords of the received BCM symbol sequence have been decoded.

In another aspect of the invention, the path metric is determined in accordance with an equation that is a sum of squared differences associated with one BCM codeword, each one of said differences being a difference between a current received sample and a sum term, wherein the sum term is a sum of one or more symbols of a candidate BCM codeword and one or more symbols of at least one previously decoded BCM codeword. For example, the path metric, $\Gamma_k^{(j)}$, may be determined in accordance with the equation:

$$\Gamma_k^{(j)} = \sum_{i=1}^{N_{block}} |r(n_i + k) - c_1(n_i + k)s^{(j)}(n_i + k) - c_2(n_i + k)\hat{s}(n_i + k - 1)|^2,$$

where $r(n_i+k)$ are received signal samples corresponding to symbols of a BCM codeword at a time $n_i+k$, $N_{block}$ is the block length of one BCM codeword, $s^j(n_i+k)$ are the symbols corresponding to the $j^{th}$ candidate for BCM codeword, and $\hat{s}(n_i+k-1)$ are the symbols of the BCM codeword (k−1) decoded in a prior step.

In still another aspect of the invention, the above-mentioned decoding step may be a forward decoding step, and the technique may further comprise the step of performing backward decoding of the received BCM signal. Alternatively, the above-mentioned decoding step may be a backward decoding step.

In yet another aspect of the invention, the technique further includes retaining a list of $N_s$ best previously decoded BCM codewords. In this case, the step of decoding is performed for each of the $N_s$ best BCM codewords.

In still another aspect of the invention, the path metric may be determined in accordance with a function that includes a term corresponding to received signal samples at fractional symbol spacing and one or more terms that are proportional to channel impulse response coefficients at fractional symbol sampling locations.

In yet another aspect of the invention, the block coded modulation symbol sequence that has been received from the channel includes deliberately introduced intersymbol interference.

In other embodiments of the invention, combined equalization and decoding of codewords encoded in a block coded modulation (BCM) symbol sequence that has been received from a channel, wherein each of the codewords comprises a plurality of symbols, is performed by determining channel impulse response estimates corresponding to each received symbol of the BCM symbol sequence. A maximum likelihood sequence estimation trellis is then advanced from one stage to a next stage by updating a path metric having dependence upon the channel impulse response estimates and upon symbols of a codeword corresponding to a state in a previous trellis stage. A completed trellis is produced by repeating the trellis-advancing step until all stages of the trellis are completed. The codewords contained in the BCM symbol sequence are then decoded by using a traceback along the best path in the completed MLSE trellis.

In another aspect of this embodiment, the path metric may be determined in accordance with the equation:

$$\Gamma_k^{(j)} = \min_l \left[ \Gamma_{k-1}^{(l)} + \sum_{i=1}^{N_{block}} |r(n_i+k) - c_1(n_i+k)s^{(j)}(n_i+k) - c_2(n_i+k)s^{(l)}(n_i+k-1)|^2 \right]$$

where $r(n_i+k)$ are the received symbols corresponding to a BCM codeword, $N_{block}$ is the block length of one BCM codeword, $s^{(j)}(n_i+k)$ are the symbols of a candidate BCM codeword for the codeword being currently decoded, and $s^{(l)}(n_i+k-1)$ are the symbols of the BCM codeword corresponding to state l in the previous MLSE trellis stage.

In still another aspect of this embodiment, the path metric may alternatively be determined in accordance with a function that includes a term corresponding to received signal samples at fractional symbol spacing and one or more terms that are proportional to channel impulse response coefficients at fractional symbol sampling locations.

In yet another aspect of this embodiment, the above-described step of advancing the maximum likelihood sequence estimation trellis from one stage to the next stage is performed in a forward direction, and the technique further comprises the step of advancing the maximum likelihood sequence estimation trellis in a reverse direction. Alternatively, the above-described step of advancing the maximum likelihood sequence estimation trellis from one stage to the next stage may be performed in a backward direction.

In still another aspect of this embodiment, the block coded modulation symbol sequence that has been received from the channel may include deliberately introduced intersymbol interference.

In yet another embodiment of the invention, combined equalization and decoding of codewords encoded in a block coded modulation (BCM) symbol sequence that has been received from a channel, wherein each of the codewords comprises a plurality of symbols, is performed by determining channel impulse response (CIR) estimates corresponding to each received symbol of the BCM symbol sequence. A maximum likelihood sequence estimation trellis is advanced from one stage to a next stage by updating a path metric having dependence upon the channel impulse response estimates and upon symbols of a codeword corresponding to a state in a previous trellis stage, wherein the path metric includes at least one term that represents intersymbol interference resulting from symbols of previously decoded codewords. A completed trellis is produced by repeating the trellis-advancing step until all stages of the trellis are completed. Then, the codewords contained in the BCM symbol sequence are decoded by using a traceback along the best path in the completed MLSE trellis.

In another aspect of this embodiment, the path metric may be determined in accordance with an iterative equation that computes a squared Euclidean distance between received symbols across one codeword of the received BCM signal and a term representing a sum of symbols of a BCM codeword corresponding to a state at stage k of the MLSE trellis and one or more symbols of one or more BCM codewords corresponding to a state at trellis stage (k−1).

In still another aspect of this embodiment, the path metric, $\Gamma_k^{(j)}$, may be determined in accordance with the equation:

$$\Gamma_k^{(j)} = \min_l \left[ \Gamma_{k-1}^{(l)} + \sum_{i=1}^{N_{block}} |r(n_i+k) - c_1(n_i+k)s^{(j)}(n_i+k) - c_2(n_i+k)s^{(l)}(n_i+k-1) - c_3(n_i+k)\hat{s}^{(l)}(n_i+k-2)|^2 \right],$$

where $r(n_i+k)$ are the received symbols across one codeword of the received BCM signal, $N_{block}$ is the block length of one BCM codeword, $s^{(j)}(n_i+k)$ are the symbols of the BCM codeword corresponding to state j at stage k of the MLSE trellis, $s^{(l)}(n_i+k-1)$ are the symbols of the BCM codeword corresponding to state l at stage (k−1) of the MLSE trellis, and $\hat{s}^{(l)}(n_i+k-2)$ are the symbols of the tentative decisions for BCM codeword (k−2), obtained by tracing back from state P at stage (k−1) of the MLSE trellis.

In yet another aspect of this embodiment, the above-mentioned step of advancing the maximum likelihood sequence estimation trellis from one stage to the next stage may be performed in a forward direction, and the technique may further comprise the step of advancing the maximum likelihood sequence estimation trellis in a reverse direction. The step of advancing the maximum likelihood sequence estimation trellis from one stage to the next stage may alternatively be performed in a backward direction.

In yet another aspect of this embodiment, the technique further includes retaining a list of $N_s$ best previously decoded codewords. In this case, the above-mentioned step of decoding is performed for each of the Ns best previously decoded codewords.

In still another aspect of this embodiment, the path metric may be determined in accordance with a function that includes a term corresponding to received signal samples at fractional symbol spacing and one or more terms that are proportional to channel impulse response coefficients at fractional symbol sampling locations.

In yet another aspect of this embodiment, the block coded modulation symbol sequence that has been received from the channel may include deliberately introduced intersymbol interference.

BRIEF DESCRIPTION OF THE DRAWINGS

The objects and advantages of the invention will be understood by reading the following detailed description in conjunction with the drawings in which.

DETAILED DESCRIPTION

Figure 1:
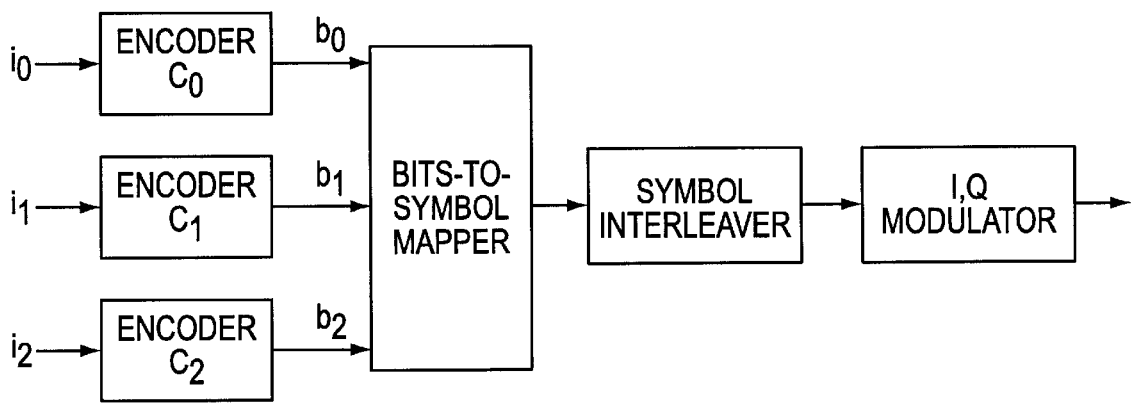
FIG. 1 is a schematic of an encoding process of an exemplary BCM scheme, based on the 8-PSK constellation.

The various features of the invention will now be described with respect to the figures, in which like parts are identified with the same reference characters.

For the purpose of description, the various inventive techniques are described in terms of block coded modulation, which lends itself particularly well for the techniques disclosed. However, the invention can be applied to any coded modulation or coding plus modulation scheme, and is not limited to use only with block coded modulation.

The various techniques described below can be implemented in any of a number of ways, including by means of a programmable processor executing a suitable set of program instructions made available to the programmable processor. Such program instructions may, for example be stored on any of a variety of computer readable storage media, including but not limited to: a random access memory (RAM); read only memory (ROM); magnetic storage device such as magnetic disk/diskette or tape; and optical storage medium such as compact disk ROM (CD ROM). In such cases, the invention may also be considered to be embodied in the computer readable storage medium having stored therein the program instructions.

In other embodiments, dedicated hardware (such as Application Specific Integrated Circuits, or "ASICs") may be designed to carry out the various functions described in detail below.

The design and manufacture of any of the above-described embodiments are well within the ability of those having ordinary skill in the art. The details of such design and manufacture are neither required to make and use the invention, nor are they within the scope of this description. Accordingly, they are omitted herein in order to avoid cluttering the description of the invention with unnecessary information. It will be recognized, however, that references in the description to "techniques", "algorithms" and the like should be construed to include not only the inventive method steps, but also apparatuses and articles of manufacture for carrying out the invention.

The block coded modulation (BCM) encoding device consists of a parallel connection of block encoders, with the outputs of the encoders being used to select a symbol from the signal constellation, by the bits-to-symbol mapper. A schematic of the encoding device of an exemplary BCM scheme, based on the 8-PSK constellation, is shown in FIG. 1. The inventive combined equalization and decoding algorithm will be described for this particular BCM scheme. However, it will be readily apparent to a person of ordinary skill in the art that the invention is not limited to the exemplary embodiments, but instead can be applied to any other BCM scheme as well.

In the BCM example considered in FIG. 1, there are three input bit streams $\{i_0, i_1, i_2\}$, each encoded by a separate block code $C_k$, k=0, 1, 2.

Figure 2A:
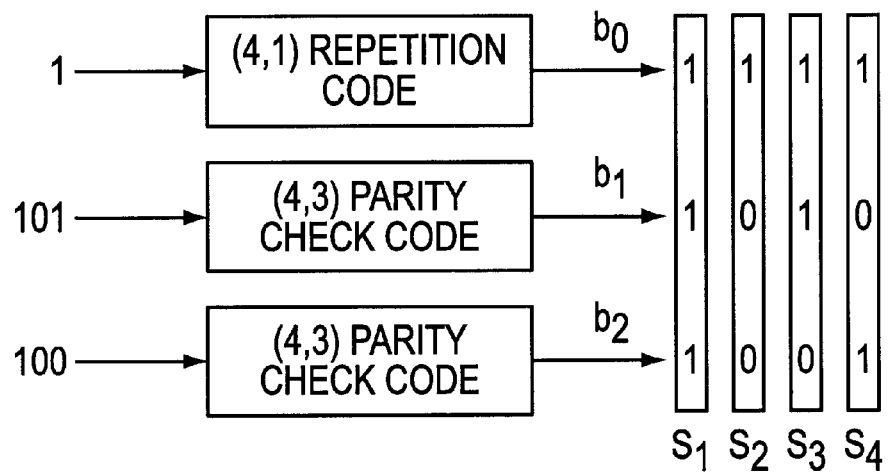
FIGS. 2a and 2b illustrate a sample BCM encoding operation, and the resulting coded bits-to-symbol mapping, respectively.
Figure 2B:
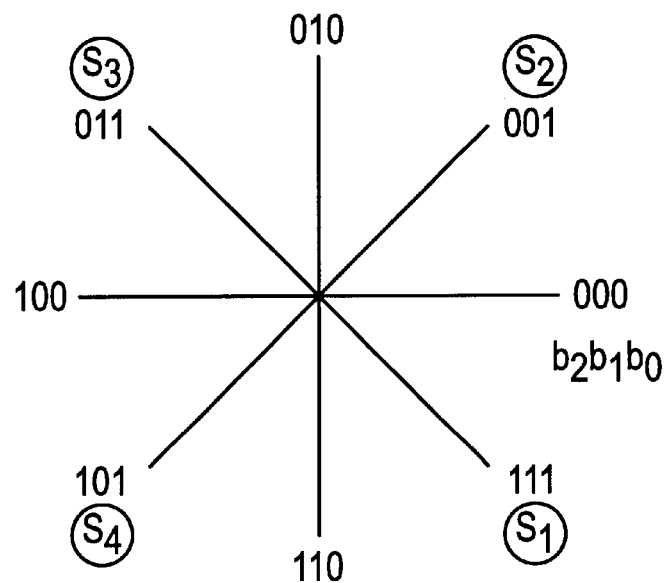

The 8-PSK constellation points are addressed using the following notation: $\{b_2 b_1 b_0\}$. Turning now to FIGS. 2a and 2b, an example of a BCM scheme with the following component codes is shown:

$C_0$: (4,1) repetition code (rate=1/4)
$C_1$: (4, 3) single parity check code (rate=3/4)
$C_2$: (4, 3) single parity check code (rate=3/4)

FIG. 2a shows a sample encoding operation, and FIG. 2b shows the resulting coded bits-to-symbol mapping. Since the block length of the codes $N_{block}$=4, each BCM codeword consists of four 8-PSK symbols $\{S_1, S_2, S_3, S_4\}$. In order to facilitate understanding of the invention, the inventive combined equalization and decoding algorithm will be described for this particular BCM scheme. However, as stated above, the invention can be applied to any other BCM scheme as well.

Figure 3:
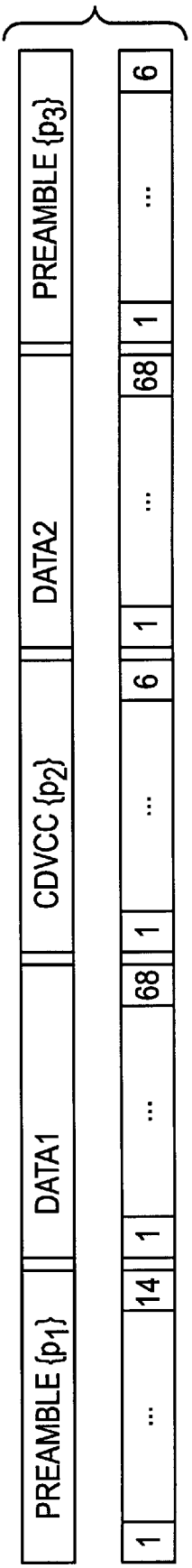
FIG. 3 illustrates an exemplary slot structure for use with the inventive combined equalization and decoding algorithm.

An exemplary slot structure for the inventive combined equalization and decoding algorithm for BCM is shown in FIG. 3. This slot structure is a modified version of the IS-136 slot structure, and is presented to facilitate understanding of the invention, since the invention may be applied to any slot structure. A description of the standard IS-136 slot structure may be found in Electronics Industries Association, *Dual Mode Mobile Station-Base Station Compatibility Standard, IS-54 Rev. A* (incorporating EIA/TIA 553), EIA/TIA Project Number 2398, October 1990.

In the presently modified version, three channel impulse response (CIR) estimates are obtained during each slot: over the Preamble $\{p_1\}$ (14 symbols), the CDVCC $\{p_2\}$ (6 symbols), and the secondary Preamble $\{p_3\}$ (6 symbols). There are two data segments, each with 68 symbols. Hence the slot contains a total of 162 symbols (as in IS-136).

Consider a two-tap channel model, $C(z)=c_1+c_2 z^{31\ 1}$. CIR estimation is done by performing the following steps:

Step 1: Obtain an initial CIR estimate, $C=[c_1 c_2]^T$, by using the pseudo-inverse method for an over-determined set of equations.

Step 2: Obtain a refined CIR estimate, $C_s$, by running an adaptive tracking algorithm over the same data.

The CIR interpolation is done using an interpolation filter (Wiener filter, Nyquist filter, etc.). Interpolation is one approach to obtain CIR values corresponding to each symbol within a slot. Other CIR estimation/interpolation methods can also be used.

Symbol interleaving is essential in order to achieve the full benefit of a BCM scheme. For the BCM scheme considered herein, a two-slot interleaving scheme is considered (consisting of a total of 272 data symbols). The interleaver is a rectangular matrix of dimensions $N_{row} \times N_{col}$, wherein the data is written in by rows and written out by columns. In any practical system, the size of the interleaver is limited by the overall encoding and decoding delay that is permissible. For BCM schemes, $N_{col}$ can be advantageously chosen to be the block length ($N_{block}$) of the BCM codeword. (This is an advantage of using combined equalization and decoding as will be apparent in the description of the inventive techniques.) Hence, for the BCM example in FIGS. 2a and 2b, $N_{col}=4$ and a 68×4 rectangular interleaver is obtained, as shown in Table 1. Each row of the interleaver matrix contains one BCM codeword. Observe that the interleaver spans two TDMA time slots, as is allowed in the IS-136 standard.

TABLE 1

| Slot n | | Slot n + 1 | |
|---|---|---|---|
| $\{p_1\}$ | $\{p_2\}$ (cont'd) | $\{p_1\}$ | $\{p_2\}$(cont'd) |
| 1 | 2 | 3 | 4 |
| 5 | 6 | 7 | 8 |
| . | . | . | . |
| . | . | . | . |
| . | . | . | . |
| 265 | 266 | 267 | 268 |
| 269 | 270 | 271 | 272 |
| $\{p_2\}$ (start) | $\{p_3\}$ | $\{p_2\}$ (start) | $\{p_3\}$ |

The procedure for obtaining the decoding trellis for a single (n, k) linear block code is described in J. Wolf, "Efficient maximum likelihood decoding of linear block codes using a trellis," *IEEE Transactions on Information Theory*, vol. IT-24, pp. 76–80, January 1978. Wolf's Method enables maximum likelihood (ML) decoding of linear block codes by applying the Viterbi Algorithm to the decoding trellis. A more detailed description of the Viterbi Algorithm may be found in G. D. Forney, "The Viterbi algorithm," *Proceedings of the IEEE*, vol. 61, pp. 268–278, March 1973. Generating the decoding trellis for BCM is a multi-dimensional extension of Wolf's method, because BCM schemes have multiple component block codes. Each BCM scheme has its unique decoding trellis. The decoding trellis for the BCM example considered herein is given in FIG. 4. The main advantages of the BCM trellis are that all the component codes are decoded simultaneously and it yields the optimum maximum likelihood result. Further, trellis decoding of BCM provides a significant reduction in the computational complexity of the BCM decoding process. Still further, it must be noted that maximum likelihood (ML) decoding of BCM yields a performance gain over sequential and iterative decoding approaches.

Basic Concept of Combined Demodulation (Equalization) and Decoding

Figure 5:
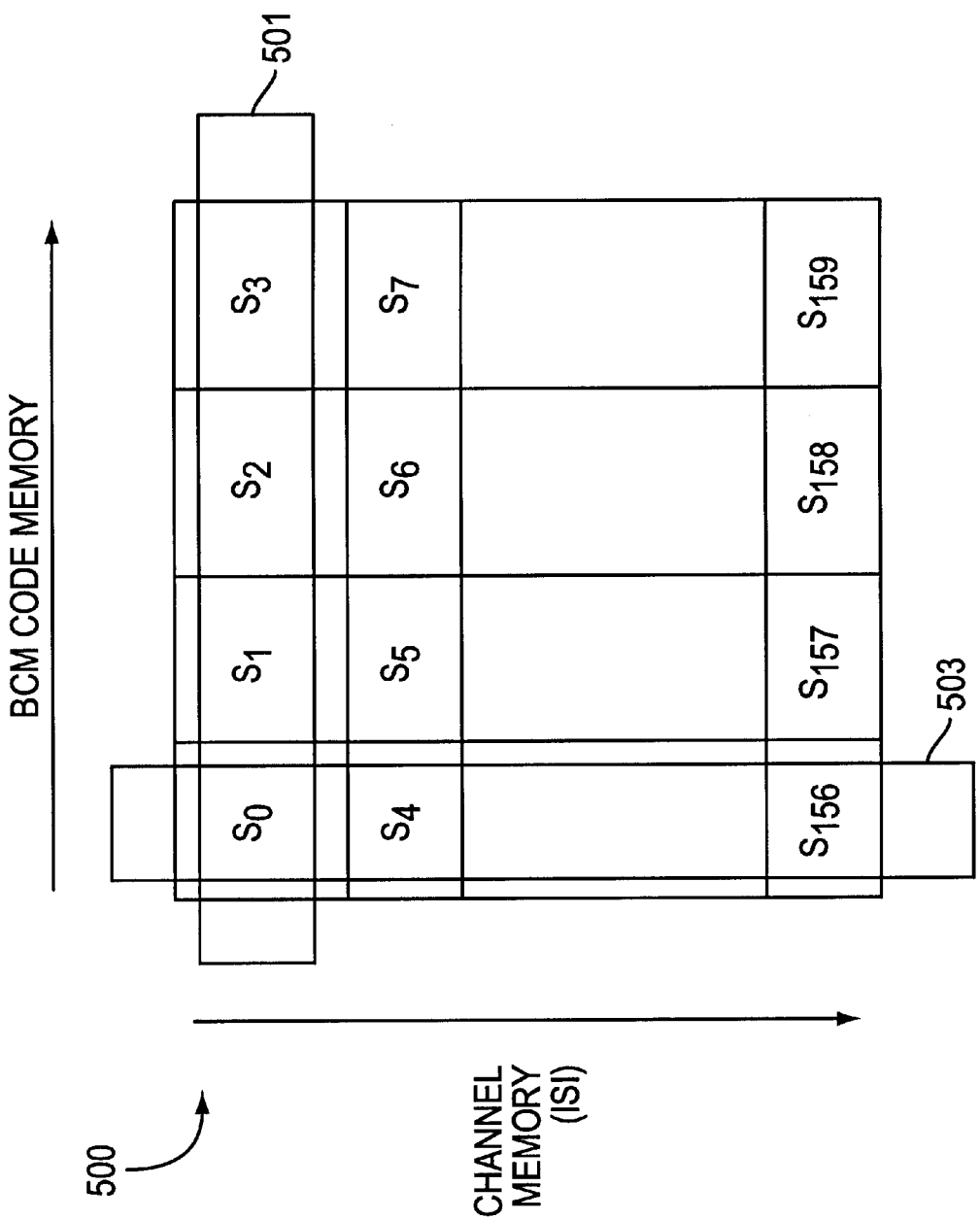
FIG. 5 is a diagram illustrating the two-dimensional memory aspects associated with interleaving of symbols.

The basic concept of combined demodulation (equalization) and decoding will now be described with respect to FIG. 5, which shows an exemplary interleaver matrix 500 indicating the relationship between symbols. Data to be coded is written into the interleaver 500 by row and read out by column. Each row contains all the symbols comprising one BCM codeword (e.g., the first row 501). The coding produces a memory, or relationship between the symbols. In this BCM example, the coding-related memory extends for one row or codeword. Since data is read out by column and transmitted in this sequence (e.g., the first column 503), the data in the transmitted sequence are related by the memory (intersymbol interference) introduced by the channel. The channel memory is defined by the channel impulse response. When symbols are related, a set of these symbols is optimally decoded using a maximum likelihood sequence estimator (MLSE). Hence, in the example of FIG. 5, we would require an MLSE decoder working along each row and another MLSE decoder working along each column. These two decoders are independent and the former, typically, works on the output of the latter. This results in suboptimal performance because information relevant to the second decoding could be destroyed by incorrect processing by the first decoding. Joint MLSE decoding using a two-dimensional decoder is therefore the optimal approach, because now both rows and columns are decoded using the same input information rather than having one decoder modify the input information to the other. However, joint decoding is more complex. The various aspects of the invention are techniques for performing joint demodulation and decoding, and also alternative techniques with lower complexity, while maintaining near-optimal performance.

Several embodiments of the inventive combined equalization and decoding techniques for the BCM schemes will now be described. The combined equalization/decoding can be done in the following three approaches:

1. Inter-Symbol Interference (ISI) cancellation
2. Maximum Likelihood Sequence Estimation (MLSE) Approach
3. Hybrid approach Each of these will now be described in greater detail.

ISI Cancellation Approach

In this embodiment, the equalization is done via ISI cancellation using decoder decisions on past symbols (which contribute to the ISI in the current received symbol).

The details of the symbol positions in the interleaving/de-interleaving pattern (for a BCM scheme with block length $N_{block}=4$) and the slot structure as shown in FIG. 3 are given in Table 1 (above) and in Table 2 (below).

TABLE 2

| | $P_1$ | $P_2$ | $P_1$ | $P_2$ |
|---|---|---|---|---|
| . | . | . | . | . |
| . | . | . | . | . |
| . | . | . | . | . |
| row 0 | $s(n_1)$ | $s(n_2)$ | $s(n_3)$ | $s(n_4)$ |
| row 1 | $s(n_1 + 1)$ | $s(n_2 + 1)$ | $s(n_3 + 1)$ | $s(n_4 + 1)$ |
| . | . | . | . | . |
| . | . | . | . | . |
| . | . | . | . | . |
| row k − 1 | $s(n_1 + k - 1)$ | $s(n_2 + k - 1)$ | $s(n_3 + k - 1)$ | $s(n_4 + k - 1)$ |
| row k | $s(n_1 + k)$ | $s(n_2 + k)$ | $s(n_3 + k)$ | $s(n_4 + k)$ |
| row k + 1 | $s(n_1 + k + 1)$ | $s(n_2 + k + 1)$ | $s(n_3 + k + 1)$ | $s(n_4 + k + 1)$ |
| . | . | . | . | . |
| . | . | . | . | . |
| . | . | . | . | . |

TABLE 2-continued

| row 67 | $s(n_1 + 67)$ $P_2$ | $s(n_2 + 67)$ $P_3$ | $s(n_3 + 67)$ $P_2$ | $s(n_4 + 67)$ $P_3$ |
|---|---|---|---|---|
| . | . | . | . | . |
| . | . | . | . | . |
| . | . | . | . | . |

The symbols to be transmitted are entered into the interleaver matrix by rows and read out by columns. In this method, each row corresponds to a BCM codeword. In the BCM example considered herein, the constituent symbols of a BCM code are distributed over two time slots on successive TDMA frames. At the receiver, the received symbols are written into the de-interleaver by columns. Each row of received symbols (corresponding to a BCM codeword) is decoded using a maximum likelihood (ML) approach as described below.

Since the transmitted data is read out by columns from the interleaver, in the presence of delay spread, each symbol will experience ISI from previous or future symbols in the same column, depending on whether the channel impulse response (CIR) has post-cursors or pre-cursors respectively. For example, consider a two-tap channel model, $C(z)=c_1+c_2z^{-1}$ or $C(z)=c_1z+c_2$, where the channel has a two ray impulse response with the two rays being one symbol apart in duration. Consider the row k of a BCM scheme (with block length $N_{block}=4$), as shown in Table 2. Suppose the symbols corresponding to row k were transmitted at time $(n_1+k)$, $(n_2+k)$, $(n_3+k)$, and $(n_4+k)$ respectively. Correspondingly, the symbols of rows (k−1) or (k+1), respectively (as per the above channel models), are also present at the time instants indicated in Table 2. The received signal $r(n_i+k)$ across one row (corresponding to a single BCM codeword) can be expressed as $$r(n_i+k)=c_1(n_i+k)s(n_i+k)+c_2(n_i+k)s(n_i+k-1)+\eta(n_i+k), i=1,2,\ldots, N_{block} \quad (1)$$

where $\{c_1,c_2\}$ are the CIR coefficients, $s(n_i+k)$ is the current symbol and $s(n_i+k-1)$ is the symbol transmitted immediately before the current symbol. The index i is the column index. In our example we have assumed a BCM codeword with a block length $N_{block}=4$ symbols. $\eta(n_i+k)$ is the additive noise (AWGN) sample or a sample of the interference (co-channel) which is herein assumed to be a Gaussian random variable.

The metric used in the BCM decoder is $\Gamma_k^{(j)}$ (for row k and the $j^{th}$ BCM codeword)

$$\Gamma_k^{(j)} = \sum_{i=1}^{N_{block}} |r(n_i+k) - c_1(n_i+k)s^{(j)}(n_i+k) - c_2(n_i+k)\hat{s}(n_i+k-1)|^2, \quad (2)$$

where $s^j(n_i+k)$ are the symbols corresponding to the $j^{th}$ BCM codeword for row k, and $\hat{s}(n_i+k-1)$ are the symbols of the BCM codeword decoded in the previous row (k−1), which are used for ISI cancellation. When we start decoding (i.e., for the first row of interleaver/de-interleaver matrix) appropriate preamble/CDVCC symbols ($p_l(.)$, l=1,2,3, which are known symbols) are used as $\hat{s}(n_i-1)$. This technique of decoding is referred to as ISI cancellation decoding and is related to using a decision feedback equalizer (DFE) for canceling the effect of post-cursors (previous symbols). This technique is akin to decision feedback equalization with the improvement of having the decoder as part of the feedback section, thereby minimizing the probability of feeding back symbol errors which would otherwise cause error propagation, commonly experienced in decision feedback equalizers. In this technique, for each row of the interleaver/de-interleaver matrix, a codeword is selected under a ML criterion, using an ISI cancellation metric. The symbols of this codeword are then carried over to the next row and used for ISI cancellation while decoding the next BCM codeword.

Figure 6:
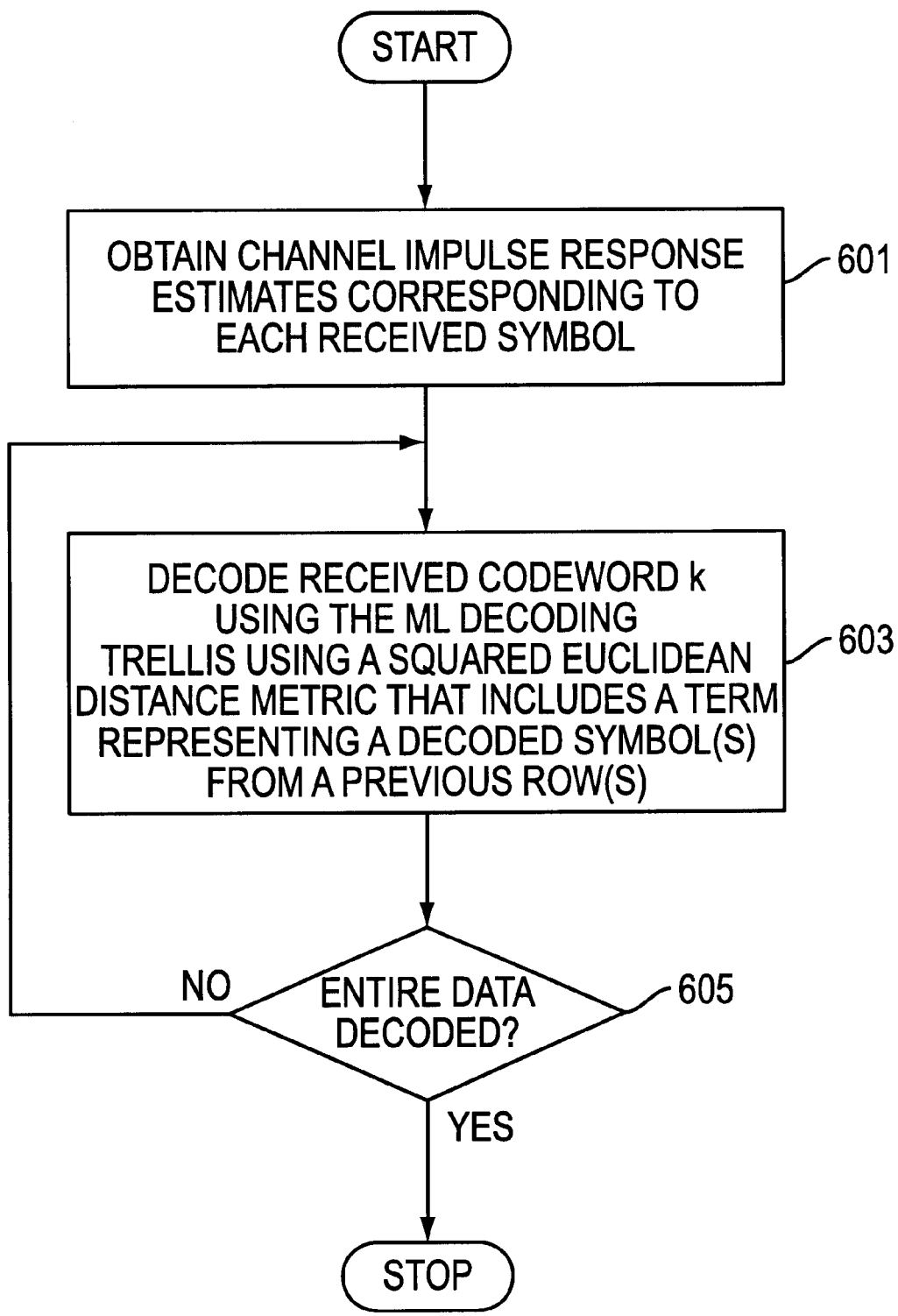
FIG. 6 is a flow chart depicting the steps of a combined equalization/decoding process in accordance with one embodiment of the invention.

Referring now to FIG. 6, the steps of the combined equalization and decoding algorithm in accordance with this first embodiment are:

Step 601: Obtain CIR estimates corresponding to each received symbol, as described above.

Step 603: Decode row k using the ML decoding trellis using a squared Euclidean distance metric that includes a term representing the ISI due to symbol(s) from previously decoded BCM codeword(s). Equation (2) is an example of one such metric. The past symbol decisions of the decoder from row (k−1) are used for ISI cancellation (If k=1, then the known preamble/CDVCC symbols as used for ISI cancellation.)

Step 605: Repeat Step 603 until entire data (2 slots) is decoded.

It should be noted that step 603 is well-suited to the case where ISI extends substantially only from one symbol to the next. It will be recognized that for those cases where the ISI extends through multiple symbols, the technique can be extended to include past symbol decisions from several previous rows or succeeding rows with alteration of the metric accordingly.

In an alternative embodiment of the invention, step 603 in the equalization/decoding process described above is done with more than a single candidate (i.e., $\hat{s}(n_i+k-1)$). Typically, the best $N_s$ candidate BCM codewords from row (k−1) are used to pick the best $N_s$ candidate codewords for row k. This approach is called a list tree algorithm (LTA), and is described in greater detail in the following section.

List Tree Algorithm

Consider the inventive ISI cancellation approach as described above. The branch metric given by equation (2) is unreliable if $$|c_1(n_i)| \ll |c_2(n_i)|, \text{ or } |c_1(n_i)| \approx 0 \quad (3)$$

The unreliable branch metrics could cause an error in the decoded BCM codeword. Since the combined equalization and decoding technique employs a decision feedback-like structure (for ISI cancellation), a decoding error (in a BCM codeword) can cause error propagation, affecting the decoding of successive codewords. This problem can be reduced by keeping more than one decoded codeword for each row, which is accomplished by using a modification of the generalized Viterbi algorithm (GVA). This modification is herein called the list tree algorithm (LTA). Information about the GVA may be found in N. Seshadri and C. W. Sundberg, "Generalized Viterbi detection with convolutional codes," *Proceedings of IEEE GLOBECOM '89*, pp. 1534–1538, November 1989. The difference between the GVA and LTA algorithms is that the GVA operates on a trellis and has a finite number of states/branches while the states/branches in the LTA grows exponentially and requires periodic pruning, as described below.

Rather than keeping only a single BCM codeword (which has the lowest metric), the LTA keeps a list of $N_s$ best BCM codewords, where $N_s$ denotes the number of survivors or codewords in the LTA. In forward decoding, each of these $N_s$ candidate codewords from row (k−1) can be used for ISI cancellation in decoding the next BCM codeword (row k) using the metric given in equation (2). For example, the following $N_s$ codewords would be retained for row (k−1)

$$[\{s^{(1)}(n_1+k-1), s^{(1)}(n_2+k-1), s^{(1)}(n_3+k-1), s^{(1)}(n_4+k-1)\},$$
$$\{s^{(2)}(n_1+k-1), s^{(2)}(n_2+k-1), s^{(2)}(n_3+k-1), s^{(2)}(n_4+k-1)\},$$
$$\{s^{(N_s)}(n_1+k-1), s^{(N_s)}(n_2+k-1), s^{(N_s)}(n_3+k-1), s^{(N_s)}(n_4+k-1)\}]. \quad (4)$$

Using the $N_s$ codewords from row (k−1), the decoding procedure will yield a total of $N_s^2$ codewords (for row k), some of which may be identical. At this stage the path metrics associated with the $N_s^2$ paths are sorted and the best $N_s$ (distinct) codewords are retained. The above procedure is repeated for each row in the interleaver/de-interleaver matrix. To make a decision on the symbols at row k we choose the best path at row (k+dd), where dd is the decision depth, and trace-back dd steps along a stored codeword path history to determine the corresponding codeword at row k. In this scheme both $N_s$ (the number of survivors) and dd (the decision depth) can be varied to determine a trade-off between complexity and performance.

MLSE Approach

Figure 4:
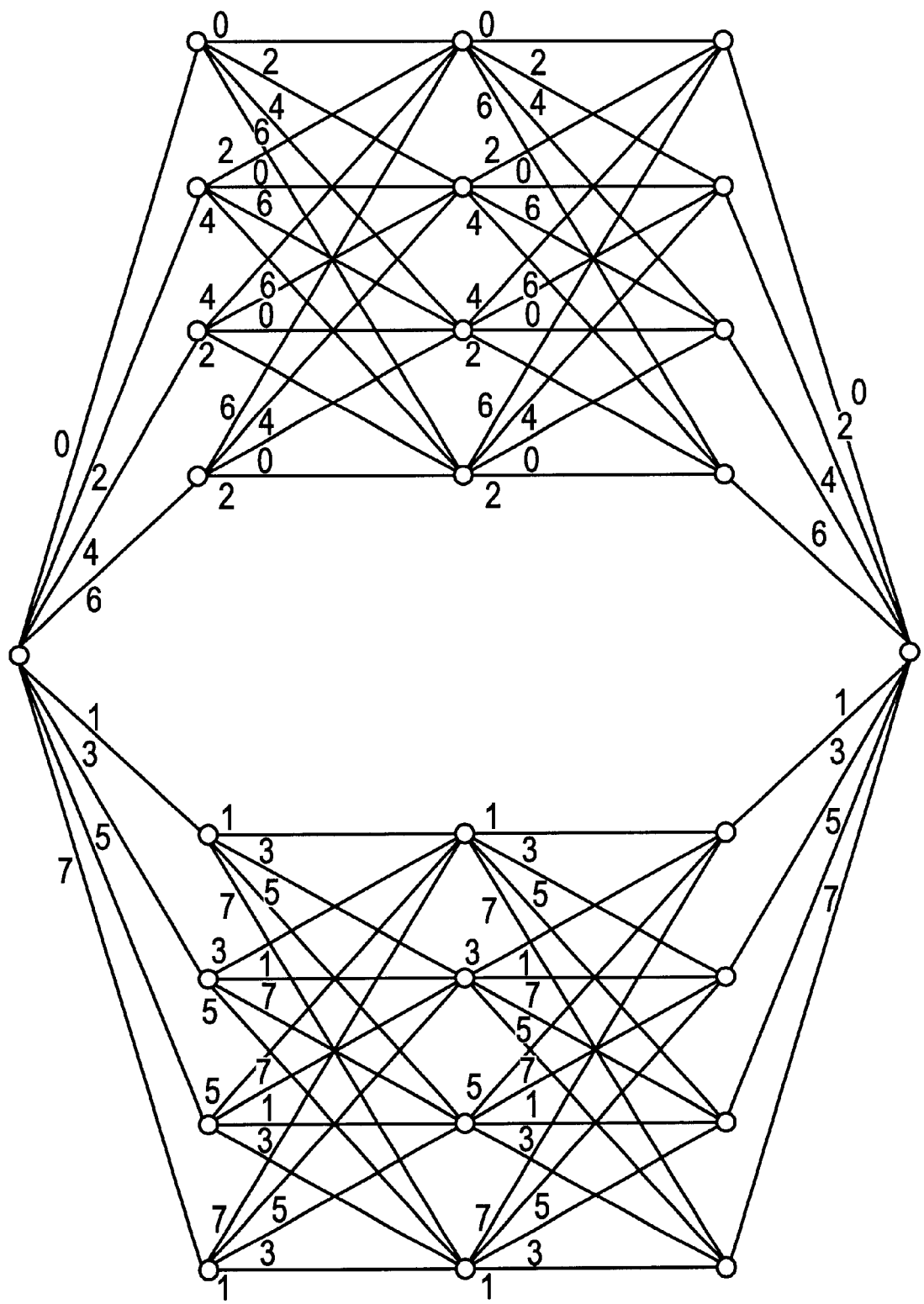
FIG. 4 illustrates a maximum likelihood (ML) decoding trellis for the exemplary BCM scheme considered herein.

The exemplary BCM scheme considered herein has a total of M (=128) codewords. (Each path in the trellis diagram of FIG. 4 represents a codeword.) As given in equation (1), for a two-tap channel model, the ISI in the BCM symbols in row k (of the interleaver) comes from the symbols of the BCM codeword in row (k−1). Furthermore, as described in G. D. Forney, "Maximum-likelihood sequence estimation of digital sequences in the presence of intersymbol interference," *IEEE Transactions in Information Theory*, vol. IT-18, pp. 363–378, May 1972, an MLSE approach for BCM decoding in the presence of ISI requires M-states, wherein each state in the trellis represents a BCM codeword.

In another embodiment of the inventive equalization/decoding process, the path metric $\Gamma_k^{(j)}$, that is used in the BCM decoder for a transition in the MLSE trellis from state l at trellis stage (k−1) to state j at trellis stage k, is $$\Gamma_k^{(j)} = \min_l \left[ \Gamma_{k-1}^{(l)} + \sum_{i=1}^{N_{block}} |r(n_i+k) - c_1(n_i+k)s^{(j)}(n_i+k) - c_2(n_i+k)s^{(l)}(n_i+k-1)|^2 \right] \quad (5)$$

where $s^{(j)}(n_i+k)$ are the symbols of the BCM codeword corresponding to state j (trellis stage k), and $s^{(l)}(n_i+k-1)$ are the symbols of the BCM codeword corresponding to state l (trellis stage k−1).

The main difference between the MLSE metric given in equation (5) and the ISI cancellation metric given in equation (2) is that no decisions have been made on the BCM codeword $s^{(l)}(n_i+k-1)$ when computing the metrics for $\Gamma_k^{(j)}$.

Figure 7:
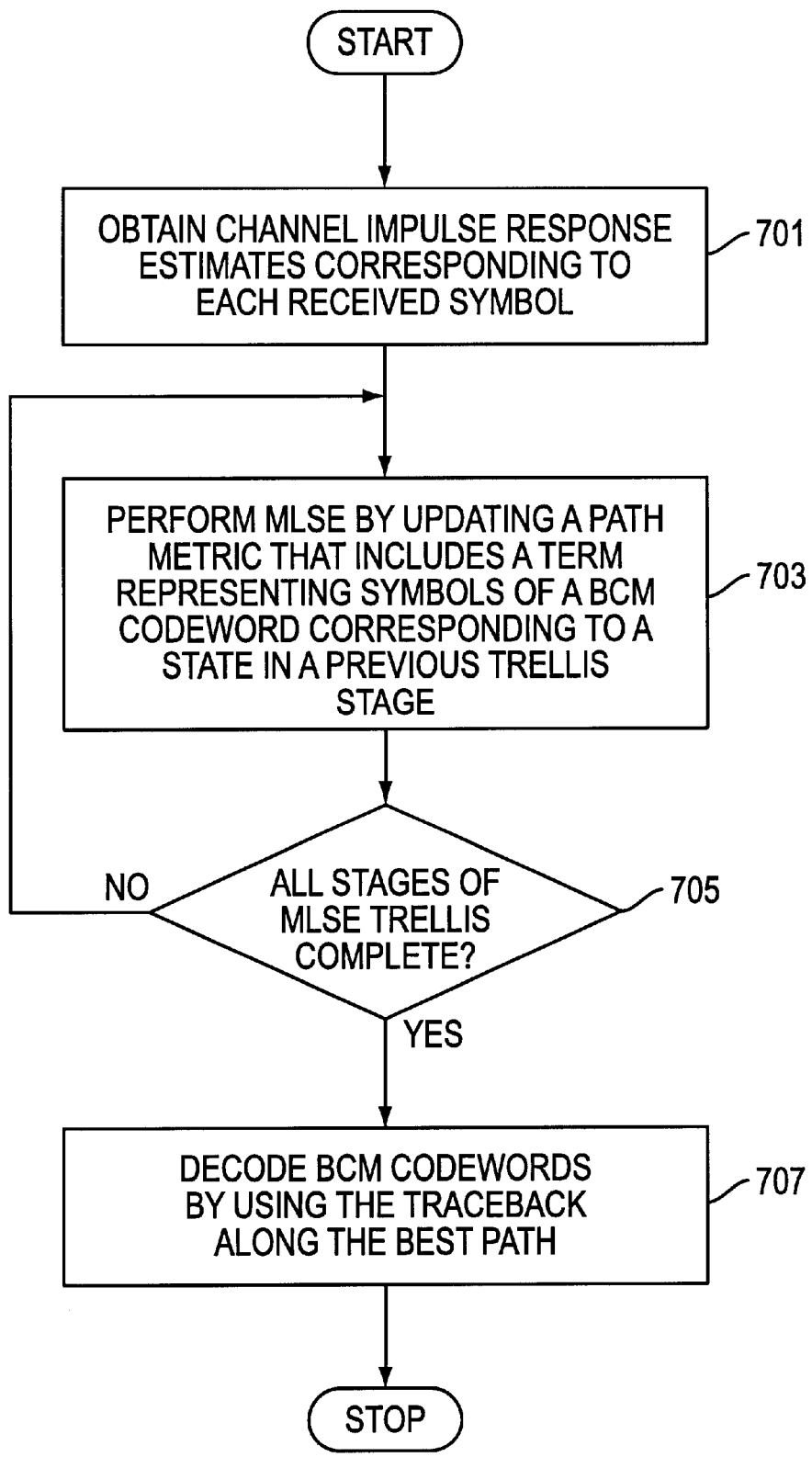
FIG. 7 is a flow chart depicting the steps of a combined equalization/decoding process in accordance with another embodiment of the invention.

Referring now to FIG. 7, the steps of the combined equalization and decoding algorithm in accordance with this embodiment of the invention are:

Step 701: Obtain CIR estimates corresponding to each received symbol, as described above.

Step 703: Perform MLSE (using the Viterbi algorithm) by updating a squared Euclidean distance path metric, $\Gamma_k^{(j)}$, that includes a term representing symbols of a BCM codeword corresponding to a state in trellis stage k and symbol(s) of the BCM codeword(s) corresponding to a state in trellis stage k−1. Equation (5) is an example of one such metric.

Steps 705 and 707: Repeat step 703 until all the stages of the MLSE trellis are completed and then decode the BCM codewords by using the traceback along the best path (as in any Viterbi algorithm).

It should be noted that step 703 is well-suited to the case where ISI extends substantially only from one symbol to the next. It will be recognized that for those cases where the ISI extends through multiple symbols, the inventive MLSE technique can be extended by appropriately modifying the metric to include terms representing symbols of a BCM codeword corresponding to states in several previous or succeeding trellis stages.

The main advantage of the MLSE approach is that each state of the MLSE corresponds to a distinct BCM codeword, unlike the LTA approach wherein additional steps are necessary to ensure the same.

If the channel model has L taps, then the MLSE trellis has $M^{(L-1)}$-states. As a consequence, the complexity of the MLSE approach grows exponentially. A tradeoff between performance and complexity is achieved using the hybrid approach described next.

Hybrid Decoding Approach

In another embodiment of the invention, a sub-optimal approach based on using a hybrid between the inventive MLSE approach and the inventive ISI cancellation approach is used in order to reduce the computational complexity of the MLSE approach. For example, if the ISI model is a three-tap model, the MLSE approach requires $M^2$-states. In accordance with the inventive hybrid approach, an M-state trellis can be used. To compute the branch metrics at time $n_i$, trace back along each trellis path (at time $n_i-1$) to determine $\hat{s}(n_i-2)$, and then use these tentatively decoded symbols. In other words, instead of trying all possible codewords for time $(n_i-2)$, tentative decisions are made based on the codewords at time $(n_i-2)$ and those symbols $\hat{s}(n_i-2)$ are used.

The metric, $\Gamma_k^{(j)}$, that is used in the BCM decoder for a transition in the MLSE trellis from state l at stage (k−1) of the trellis to state j to stage k of the trellis is $$\Gamma_k^{(j)} = \min_l \left[ \Gamma_{k-1}^{(l)} + \sum_{i=1}^{N_{block}} |r(n_i+k) - c_1(n_i+k)s^{(j)}(n_i+k) - c_2(n_i+k)s^{(l)}(n_i+k-1) - c_3(n_i+k)\hat{s}^{(l)}(n_i+k-2)|^2 \right], \quad (6)$$

where $s^{(j)}(n_i+k)$ are the symbols of the BCM codeword corresponding to state j (row k), $s^{(l)}(n_i+k-1)$ are the symbols of the BCM codeword corresponding to state l in row (k−1), and $\hat{s}(l)(n_i+k-2)$ are the tentative decisions for row (k−2), obtained by tracing back from state l of the MLSE trellis (at time $(n_i+k-1)$).

Comparing equations (6), (5), and (2), it can be seen that the metric used for the hybrid approach uses the MLSE approach for the nearest ISI terms and it uses ISI cancellation for the others. This yields a good tradeoff between computational complexity and performance.

Figure 8:
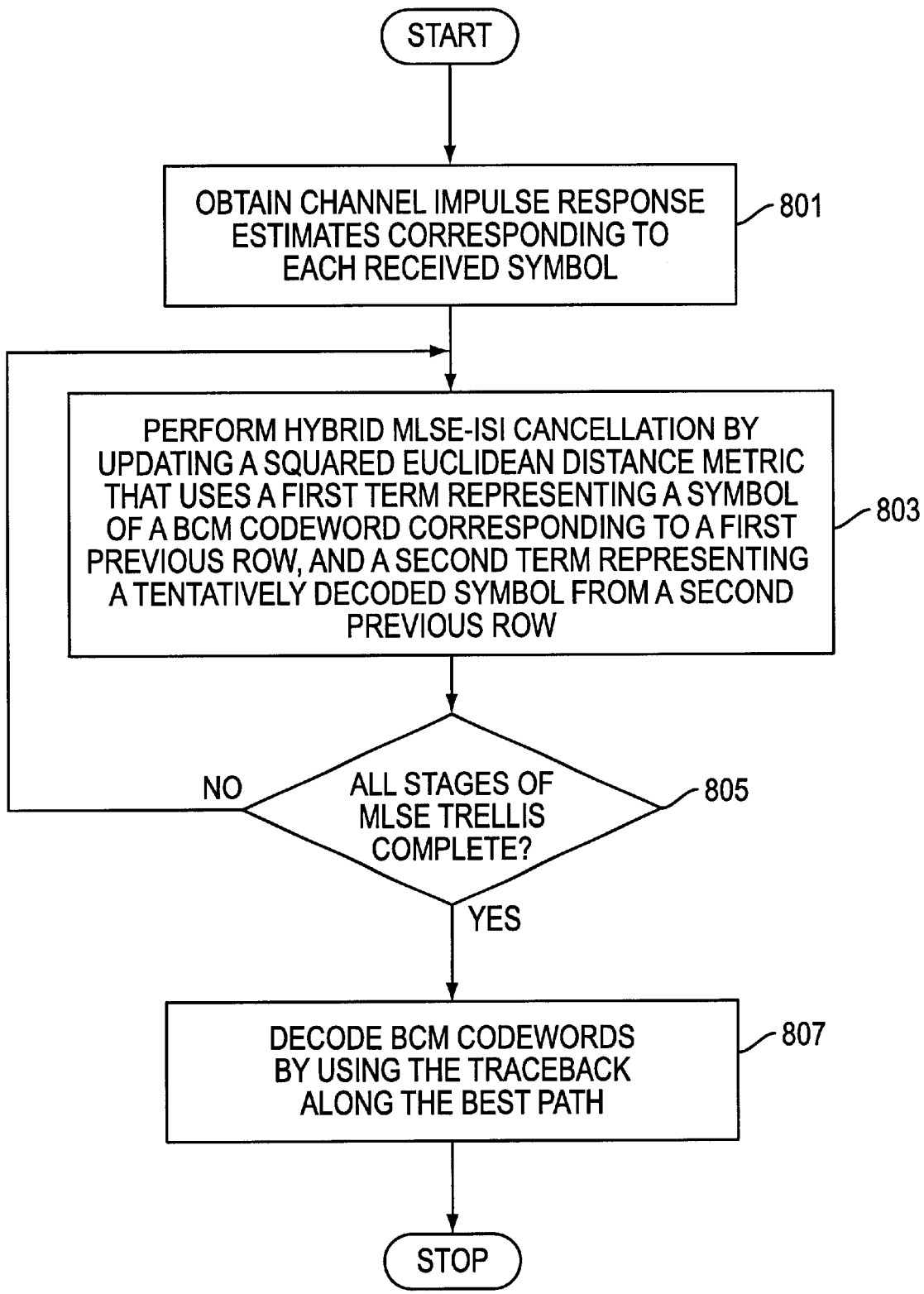
FIG. 8 is a flow chart depicting the steps of a combined equalization/decoding process in accordance with yet another embodiment of the invention.

Referring now to FIG. 8, the steps of the combined equalization and decoding algorithm in accordance with this embodiment of the invention are:

Step 801: Obtain CIR estimates corresponding to each received symbol, as described above.

Step 803: Perform hybrid MLSE-ISI cancellation algorithm by updating a squared Euclidean distance path metric, $\Gamma_k^{(j)}$, that uses a first term representing a symbol of a BCM codeword corresponding to a first previous codeword, and a second term representing a tentatively decoded symbol from a second previous codeword. Equation (6) is an example of one such path metric.

Steps 805 and 807: Repeat step 803 until all the stages of the MLSE trellis are completed and then decode the BCM codewords by using the traceback along the best path.

It should be noted that step 803 is well-suited to the case where ISI extends substantially only from one symbol to the next. It will be recognized that for those cases where the ISI extends through multiple symbols, the inventive hybrid MLSE technique can be extended by appropriately modifying the metric to include multiple ISI cancellation terms.

A number of embodiments of the inventive technique for performing combined equalization/decoding of block code modulated information have been described. In yet further aspects of the invention, additional enhancements may be applied to these techniques. These enhancements will now be described.

Bidirectional Decoding

The technique of decoding the data in a slot in both the forward and backward directions is referred to as bidirectional decoding. See, for example, S. Chennakeshu, R. D. Koilpillai, and R. L. Toy, "A low complexity MLSE equalizer for U.S. Digital Cellular mobile receivers," G.E. Technical Information Series, December 1991, GE-CRD Technical Report (Class 2) 91CRD247; and Y. Liu, "Bi-directional equalization for TDMA communication systems over land mobile radio channels," *Proceedings of IEEE GLOBECOM '91*, pp. 41.1.1–41.1.5, December 1991. The main motivation for considering bidirectional decoding is to improve the performance of the decoder when the channel exhibits severe non-minimum phase condition, that is, when $|c_1| \ll c_2|$.

The metric given in equation (2) is minimized over all of the BCM codewords using the symbols $s^{(j)}(n_i+k)$ (corresponding to each BCM codeword). If $|c_1(n_i)| \approx 0$, the metric (given by equation (2)) is approximately the same for all values of $s^{(j)}(n_i+k-1)$, (i.e., for all the different BCM codewords) thereby increasing the likelihood of an error in decoding the BCM codeword. This problem is characteristic of decision feedback-based ISI cancellation schemes.

In accordance with this aspect of the invention, the metrics for forward and backward decoding respectively using ISI cancellation decoding of the BCM codeword in row k are given by:

Forward Decoding; Assuming that the BCM codeword corresponding to row (k−1) has been decoded (i.e., the symbols $\hat{s}(n_i+k-1)$ are known), the symbols $s^{(j)}(n_i+k)$ (row k) are decoded by minimizing the metric $$\Gamma_{k,f}^{(j)} = \sum_{i=1}^{N_{block}} |r(n_i+k) - c_1(n_i+k)s^{(j)}(n_i+k) - c_2(n_i+k)\hat{s}(n_i+k-1)|^2. \quad (7)$$

Backward Decoding: Assuming that the BCM codeword corresponding to row (k+1) has been decoded (i.e., the symbols $\hat{s}(n_i+k+1)$ are known), the symbols $s^{(j)}(n_i+k)$ (row k) are decoded by minimizing the metric $$\Gamma_{k,b}^{(j)} = \sum_{i=1}^{N_{block}} |r(n_i+k+1) - c_1(n_i+k+1)\hat{s}(n_i+k+1) - c_2(n_i+k+1)s^{(j)}(n_i+k)|^2. \quad (8)$$

Both forward and backward decoding are done and the direction that provides a better metric over each data segment (block of symbols) is selected and its data decisions are used as the decoded output.

The inventive ISI cancellation approach for forward and backward decoding has been described above. In other embodiments of the invention, the MLSE decoding approach and the hybrid decoding approach can also be implemented with bidirectional decoding with the appropriate modifications to the metrics. In particular, for MLSE decoding, forward decoding is in accordance with:

$$\Gamma_{k,f}^{(j)} = \min_l \left[ \Gamma_{k-1,f}^{(l)} + \sum_{i=1}^{N_{block}} |r(n_i+k) - c_1(n_i+k)s^{(j)}(n_i+k) - c_2(n_i+k)s^{(l)}(n_i+k-1)|^2 \right]$$

MLSE backward decoding is in accordance with $$\Gamma_{k,b}^{(j)} = \min_l \left[ \Gamma_{k+1,b}^{(l)} + \sum_{i=1}^{N_{block}} |r(n_i+k+1) - c_1(n_i+k+1)s^{(l)}(n_i+k+1) + c_2(n_i+k+1)s^{(j)}(n_i+k)|^2 \right]$$

For the case of hybrid decoding, forward decoding proceeds in accordance with:

$$\Gamma_{k,f}^{(j)} = \min_l \left[ \Gamma_{k-1,f}^{(l')} + \sum_{i=1}^{N_{block}} |r(n_i+k) - c_1(n_i+k)s^{(j)}(n_i+k) - c_2(n_i+k)s^{(l)}(n_i+k-1) - c_3(n_i+k)\hat{s}(n_i+k-2)|^2 \right]$$

Backward hybrid decoding is in accordance with:

$$\Gamma_{k,b}^{(j)} = \min_l \left[ \Gamma_{k+1,b}^{(l)} + \sum_{i=1}^{N_{block}} |r(n_i+k+2) - c_1(n_i+k+2)\hat{s}(n_i+k+2) - c_2(n_i+k+2)s^{(l)}(n_i+k+1) - c_3(n_i+k+2)s^{(j)}(n_i+k)|^2 \right]$$

With respect to any of the bidirectional decoding techniques, several approaches can be taken. One option is to perform both forward decoding and backward decoding and then pick the one that gives the best results, based on a comparison of metric values obtained in forward and backward decoding. A second, lower complexity option is to perform either forward or backward decoding or a combination of both (i.e., performing forward decoding up to a point, and backward decoding to that same point). In this second option one should use appropriate criteria to choose the direction of decoding. Typical criteria include received signal strength (RSSI), and comparison of metric values in forward decoding and backward decoding.

Fractionally Spaced Metrics

For fractional delay spreads the performance of the combined equalization and decoding algorithm can be significantly improved by using fractionally spaced metrics as described herein. In order to mitigate the model mismatch between the true channel and the estimated channel (for fractional delay spreads), the branch metric must be modified. A method for doing this for an MLSE equalizer as applied to the DAMPS system has been described in Y. Wan, Q. Liu, and A. M. Sendyk, "A fractionary-spaced maximum likelihood sequence estimation receiver in a multipath fading environment," *Proceedings of IEEE ICASSP '92*, pp. 689–692, May 1992. In accordance with another aspect of the invention, an approach is now presented for using fractionally spaced metrics for the inventive application of combined equalization and decoding of BCM.

When there are fractional delay spreads, the ISI extends over several symbol periods because of the pulse shaping function. The pulse shape decays rapidly over a few symbol periods, and hence, can be truncated. Consider the three-tap CIR models $C(z)=c_1+c_2z^{-1}+c_3z^{-2}$ (for the integer sampling locations) and $C'(z)=c'_1+c'_2z^{-1}+c'_3z^{-2}$ (for the fractional sampling locations). (With integer sampling, the sampling rate is one sample per symbol duration; for the case of fractional sampling, the sampling rate is multiple samples per symbol duration.) Accordingly the received signal samples at half symbol spacing can be expressed as $$r(n_i) \approx c_1(n_i)s(n_i)+c_2(n_i)s(n_i-1)+c_3(n_i)s(n_i-2)+\eta(n_i), \quad (9)$$

$$r(n_i-\tfrac{1}{2}) \approx c'_1(n_i)s(n_i)+c'_2(n_i)s(n_i-1)+c'_3(n_i)s(n_i-2)+\eta(n_i-\tfrac{1}{2}), \quad (10)$$

where $\{c_j(n_i)\}$, $j=1,2,3$ are the channel impulse response (CIR) coefficients at the integer sampling locations and $\{c'_j(n_i)\}$, $j=1,2,3$ are the CIR coefficients at the fractional sampling location, and $\eta(n_i)$ and $\eta(n_i-\tfrac{1}{2})$ are independent interference samples assumed to be zero mean Gaussian random variables.

The metric (using a sampling rate of two samples per symbol for the received signal) for the ISI cancellation approach is given by $$\{|r(n_i+k)-c_1(n_i+k)s^{(l)}(n_i+k)-c_2(n_i+k)\hat{s}(n_i+k-1)-c_3$$
$$(n_i+k)\hat{s}(n_i+k-2)|^2 + \Gamma_{k,f}^{(l)} = |r(n_i+k-\tfrac{1}{2})-c'_1(n_i+k)s^{(l)}$$
$$(n_i+k)-c'_2(n_i+k)\hat{s}(n_i+k-1)-c'_3(n_i+k)\hat{s}(n_i+k-2)|^2\} \quad (11)$$

Similarly, the use of fractionally spaced metrics can be applied to the other BCM decoding methods as well. For the MLSE technique, the metric would be:

$$\Gamma_{k,f}^{(l)} = \min [\Gamma_{k-1,f}^{(l)} + \{|r(n_i+k)-c_1(n_i+k)s^{(l)}(n_i+k)-c_2$$
$$(n_i+k)s^{(l)}(n_i+k-1)-c_3(n_i+k)s^{(l)}(n_i+k-2)|^2 +$$
$$|r(n_i+k-\tfrac{1}{2})-c'_1(n_i+k)s^{(l)}(n_i+k)-c'_2(n_i+k)s^{(l)}(n_i+k-1)-c'_3(n_i+k)s^{(l)}(n_i+k-2)|^2\}]$$

The fractionally spaced hybrid technique would use the following metric:

$$\Gamma_{k,f}^{(l)} = \min [\Gamma_{k-1,f}^{(l)} + \{|r(n_i+k)-c_1(n_i+k)s^{(l)}(n_i+k)-_2(n_i+k)s^{(l)}$$
$$(n_i+k-1)-c_3(n_i+k)\hat{s}(n_i+k-2)|^2 + |r(n_i+k-\tfrac{1}{2})-c'_1(n_i+k)s^{(l)}$$
$$(n_i+k)-_2'(n_i+k)s^{(l)}(n_i+k-1)-c_3'(n_i+k)\hat{s}(n_i+k-2)|^2\}]$$

Fractionally spaced metrics are used when the channel has fractional delay spread. Typically, additional taps are needed to model fractional delay channels. Hence, as an illustrative example, a channel model with three taps is shown.

In this disclosure, three embodiments for implementing combined equalization and decoding for coded modulation schemes have been presented. The three approaches were demonstrated for a specific BCM scheme but can be applied to any other coded modulation scheme as well. The decoding of the BCM codeword is done using a maximum likelihood (ML) approach, using a multidimensional extension of Wolf's method for trellis decoding of block codes. Three enhancements of the combined equalization and decoding algorithm are also presented. They include the use of bidirectional (forward and backward) decoding, the use of the list tree algorithm to improve the performance of the ISI-cancellation approach, and the use of fractionally spaced metrics to improve the equalizer performance when the channel causes fractional delay spreads.

The invention has been described with reference to particular embodiments. However, it will be readily apparent to those skilled in the art that it is possible to embody the invention in specific forms other than those of the preferred embodiment described above. This may be done without departing from the spirit of the invention.

For example, the above techniques have been described with respect to the problem of channel ISI, which is a physical phenomenon. However, there are techniques which deliberately introduce ISI which is then compensated for by the equalizer in the receiver. One such example is transmitter delay diversity, wherein the same signal is transmitted from two or more uncorrelated antennas with time lag between the transmission from the different antennas. It will be apparent to one of ordinary skill in the art that the above-described decoding techniques can be applied in this environment as well.

The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of performing combined equalization and decoding of codewords encoded in a block coded modulation (BCM) symbol sequence that has been received from a channel, wherein each of the codewords comprises a plurality of symbols, the method comprising:

determining channel impulse response estimates corresponding to each received symbol of the BCM symbol sequence;

advancing a maximum likelihood sequence estimation trellis from one stage to a next stage by updating a path metric having dependence upon the channel impulse response estimates and upon symbols of a codeword corresponding to a state in a previous trellis stage;

producing a completed trellis by repeating the trellis-advancing step until all stages of the trellis are completed; and decoding the codewords contained in the BCM symbol sequence by using a traceback along the best path in the completed MLSE trellis.

2. The method of claim 1, wherein the path metric includes at least one term representing intersymbol interference resulting from one or more symbols of one or more previously decoded codewords.

3. The method of claim 2, wherein the path metric is determined in accordance with an equation that is a sum of squared differences associated with one BCM codeword, each one of said differences being a difference between a current received sample and a sum term, wherein the sum term is a sum of one or more symbols of a candidate BCM codewords and a term related to one or more symbols of at least one previously decoded BCM codeword.

4. The method of claim 3,
wherein the BCM symbol sequence is determined by an interleaver having $N_{block}$ columns and a number of rows, and
wherein the path metric, $\Gamma_k^{(j)}$ for a jth BCM codeword associated with a kth row of the interleaver, is determined in accordance with the equation:

$$\Gamma_k^{(j)} = \sum_{i=1}^{N_{block}} |r(n_i+k) - c_1(n_i+k)s^{(j)}(n_i+k) - c_2(n_i+k)\hat{s}(n_i+k-1)|^2,$$

where $n_i$ is a time instant at which a first BCM codeword symbol associated with column i of the interleaver is received, $r(n_i+k)$ are received signal samples corresponding to symbols of a BCM codeword at a time $n_i+k$, $N_{block}$ is the block length of one BCM codeword, $s^j(n_i+k)$ are the symbols corresponding to the $j^{th}$ candidate for BCM codeword, $\hat{s}(n_i+k-1)$ are the symbols of the BCM codeword (k-1) decoded in a prior step and $c_1(n_i+k)$ and $c_2(n_i+k)$ are first and second coefficients of a channel impulse response estimate at time $n_i+k$.

5. The method of claim 2, the step of advancing the maximum likelihood sequence estimation trellis from one stage to the next stage is performed in a forward direction, and further comprising a step of advancing the maximum likelihood sequence estimation trellis in a reverse direction.

6. The method of claim 2, wherein the step of advancing the maximum likelihood sequence estimation trellis from one stage to the next stage is performed in a backward direction.

7. The method of claim 2, further comprising:
retaining a list of $N_s$ best previously decoded BCM codewords, and
wherein the step of decoding is performed for each of the $N_s$ best BCM codewords.

8. The method of claim 2, wherein the path metric is determined in accordance with a function that includes a term corresponding to received signal samples at fractional symbol spacing and one or more terms that are proportional to channel impulse response coefficients at fractional symbol sampling locations.

9. The method of claim 2, wherein the block coded modulation symbol sequence that has been received from the channel includes deliberately introduced intersymbol interference.

10. The method of claim 1,
wherein the BCM symbol sequence is determined by an interleaver having $N_{block}$ columns and a number of rows, and
wherein the path metric, $\Gamma_k^{(j)}$ for a transition in the maximum likelihood sequence estimation trellis from state l at trellis stage (k-1) to state j at trellis stage k is determined in accordance with the equation:

$$\Gamma_k^{(j)} = \min_l \left[ \Gamma_{k-1}^{(l)} + \sum_{i=1}^{N_{block}} |r(n_i+k) - c_1(n_i+k)s^{(j)}(n_i+k) - c_2(n_i+k)s^{(l)}(n_i+k-1)|^2 \right]$$

where l is a variable that takes on values covering all possible states at trellis stage (k-1).

$n_i$ is a time instant at which a first BCM codeword symbol associated with column i of the interleaver is received, $r(n_i+k)$ are the received symbols corresponding to a BCM codeword, $N_{block}$ is the block length of one BCM codeword, $s^{(j)}(n_i+k)$ are the symbols of a candidate BCM codeword for the codeword being currently decoded, $s^{(l)}(n_i+k-1)$ are the symbols of the BCM codeword corresponding to state l in the previous MLSE trellis stage, and $c_1(n_i+k)$ and $c_2(n_i+k)$ are first and second coefficients of a channel impulse response estimate at time $n_i+k$.

11. The method of claim 1, wherein the path metric is determined in accordance with a function that includes a term corresponding to received signal samples at fractional symbol spacing and one or more terms that are proportional to channel impulse response coefficients at fractional symbol sampling locations.

12. The method of claim 1, wherein the step of advancing the maximum likelihood sequence estimation trellis from one stage to the next stage is performed in a forward direction, and further comprising the step of advancing the maximum likelihood sequence estimation trellis in a reverse direction.

13. The method of claim 1, wherein the step of advancing the maximum likelihood sequence estimation trellis from one stage to the next stage is performed in a backward direction.

14. The method of claim 1, wherein the block coded modulation symbol sequence that has been received from the channel includes deliberately introduced intersymbol interference.

15. The method of claim 1, wherein the path metric includes at least one term that represents intersymbol interference resulting from symbols of previously decoded codewords.

16. The method of claim 15, wherein the path metric is determined in accordance with an iterative equation that computes a squared Euclidean distance between received symbols across one codeword of the received BCM signal and a term representing a sum of symbols of a BCM codeword corresponding to a state at stage k of the MLSE trellis and one or more symbols of one or more BCM codewords corresponding to a state at trellis stage (k-1).

17. The method of claim 15, wherein the path metric, $\Gamma_k^{(j)}$, is determined in $$\Gamma_k^{(j)} = \min_l \left[ \Gamma_{k-1}^{(l)} + \sum_{i=1}^{N_{block}} |r(n_i+k) - c_1(n_i+k)s^{(j)}(n_i+k) - c_2(n_i+k)s^{(l)}(n_i+k-1) - c_3(n_i+k)\hat{s}^{(l)}(n_i+k-2)|^2 \right],$$

accordance with the equation:
where l is a variable that takes on values covering all possible states at trellis stage (k-1), r($n_i$+k) are the received symbols across one codeword of the received BCM signal, $N_{block}$ is the block length of one BCM codeword, $s^{(j)}(n_i+k)$ are the symbols of the BCM codeword corresponding to state j at stage k of the MLSE trellis, $s^{(l)}(n_i+k-1)$ are the symbols of the BCM codeword corresponding to state l at stage (k-1) of the MLSE trellis, $\hat{s}(n_i+k-2)$ are the symbols of the tentative decisions for BCM codeword (k-2), obtained by tracing back from state l at stage (k-1) of the MLSE trellis, and $c_1(n_i+k)$, $c_2(n_i+k)$ and $c_3(n_i+k)$ are first, second and third coefficients of a channel impulse response estimate at time $n_i$+k.

18. The method of claim 15, wherein the step of advancing the maximum likelihood sequence estimation trellis from one stage to the next stage is performed in a forward direction, and further comprising the step of advancing the maximum likelihood sequence estimation trellis in a reverse direction.

19. The method of claim 15, wherein the step of advancing the maximum likelihood sequence estimation trellis from one stage to the next stage is performed in a backward direction.

20. The method of claim 15, further comprising:
retaining a list of $N_s$ best previously decoded codewords, and wherein the step of decoding is performed for each of the $N_s$ best previously decoded codewords.

21. The method of claim 15, wherein the path metric is determined in accordance with a function that includes a term corresponding to received signal samples at fractional symbol spacing and one or more terms that are proportional to channel impulse response coefficients at fractional symbol sampling locations.

22. The method of claim 15, wherein the block coded modulation symbol sequence that has been received from the channel includes deliberately introduced intersymbol interference.

23. An apparatus for performing combined equalization and decoding of codewords encoded in a block coded modulation (BCM) symbol sequence that has been received from a channel, wherein each of the codewords comprises a plurality of symbols, the apparatus comprising:
a channel estimator that determines channel impulse response estimates corresponding to each received symbol of the BCM symbol sequence; and
a decoder that:
advances a maximum likelihood sequence estimation trellis from one stage to a next stage by updating a path metric having dependence upon the channel impulse response estimates and upon symbols of a codeword corresponding to a state in a previous trellis stage;
produces a completed trellis by repeating the trellis-advancing step until all stages of the trellis are completed; and
decodes the codewords contained in the BCM symbol sequence by using a traceback along the best path in the completed MLSE trellis.

24. The apparatus of claim 23, wherein the path metric includes at least one term representing intersymbol interference resulting from one or more symbols of one or more previously decoded codewords.

25. The apparatus of claim 24, further comprising means for determining the path metric in accordance with an equation that is a sum of squared differences associated with one BCM codeword, each one of said differences being a difference between a current received sample and a sum term, wherein the sum term is a sum of one or more symbols of a candidate BCM codewords and a term related to one or more symbols of at least one previously decoded BCM codeword.

26. The apparatus of claim 25,
wherein the BCM symbol sequence is determined by an interleaver having $N_{block}$ columns and a number of rows, and
wherein the means for determining the path metric determines the path metric, $\Gamma_k^{(j)}$ for a jth BCM codeword associated with a kth row of the interleaver, in accordance with the equation:

$$\Gamma_k^{(j)} = \sum_{i=1}^{N_{block}} |r(n_i+k) - c_1(n_i+k)s^{(j)}(n_i+k) - c_2(n_i+k)\hat{s}(n_i+k-1)|^2,$$

where $n_i$ is a time instant at which a first BCM codeword symbol associated with column i of the interleaver is received, r($n_i$+k) are received signal samples corresponding to symbols of a BCM codeword at a time $n_i$+k, $N_{block}$ is the block length of one BCM codeword, $s^j(n_i+k)$ are the symbols corresponding to the $j^{th}$ candidate for BCM codeword, and $\hat{s}(n_i+k-1)$ are the symbols of the BCM codeword (k-1) decoded in a prior step, and $c_1(n_i+k)$ and $c_2(n_i+k)$ are first and second coefficients of a channel impulse response estimate at time $n_i$+k.

27. The apparatus of claim 24, wherein the decoder advances the maximum likelihood sequence estimation trellis from one stage to the next stage in a forward direction, and wherein further the decoder advances the maximum likelihood sequence estimation trellis in a reverse direction.

28. The apparatus of claim 24, wherein the decoder advances the maximum likelihood sequence estimation trellis from one stage to the next stage in a backward direction.

29. The apparatus of claim 24, further comprising:
a memory that retains a list of $N_s$ best previously decoded BCM codewords, and
wherein the decoder performs a decoding step for each of the $N_s$ best BCM codewords.

30. The apparatus of claim 24, further comprising means for determining the path metric in accordance with a function that includes a term corresponding to received signal samples at fractional symbol spacing and one or more terms that are proportional to channel impulse response coefficients at fractional symbol sampling locations.

31. The apparatus of claim 24, wherein the block coded modulation symbol sequence that has been received from the channel includes deliberately introduced intersymbol interference.

32. The apparatus of claim 23,
wherein the BCM symbol sequence is determined by an interleaver having $N_{block}$ columns and a number of rows, and
further comprising means for determining the path metric, $\Gamma_k^{(j)}$ for a transition in the maximum likelihood sequence estimation trellis from state l at trellis stage (k-1) to state j at trellis stage k, in accordance with the equation:

$$\Gamma_k^{(j)} = \min_l \left[ \Gamma_{k-1}^{(l)} + \right.$$

-continued $$\sum_{i=1}^{N_{block}} |r(n_i+k) - c_1(n_i+k)s^{(j)}(n_i+k) - c_2(n_i+k)s^{(l)}(n_i+k-1)|^2 \Bigg]$$

where l is a variable that takes on values covering all possible states at trellis stage (k−1),
$n_i$ is a time instant at which a first BCM codeword symbol associated with column i of the interleaver is received,
$r(n_i+k)$ are the received symbols corresponding to a BCM codeword, $N_{block}$ is the block length of one BCM codeword, $s^{(j)}(n_i+k)$ are the symbols of a candidate BCM codeword for the codeword being currently decoded, $s^{(l)}(n_i+k-1)$ are the symbols of the BCM codeword corresponding to state l in the previous MLSE trellis stage, and $c_1(n_i+k)$ and $c_2(n_i+k)$ are first and second coefficients of a channel impulse response estimate at time $n_i+k$.

33. The apparatus of claim 23, further comprising means for determining the path metric in accordance with a function that includes a term corresponding to received signal samples at fractional symbol spacing and one or more terms that are proportional to channel impulse response coefficients at fractional symbol sampling locations.

34. The apparatus of claim 23, wherein the decoder advances the maximum likelihood sequence estimation trellis from one stage to the next stage in a forward direction, and wherein further the decoder advances the maximum likelihood sequence estimation trellis in a reverse direction.

35. The apparatus of claim 23, wherein the decoder advances the maximum likelihood sequence estimation trellis from one stage to the next stage in a backward direction.

36. The apparatus of claim 23, wherein the block coded modulation symbol sequence that has been received from the channel includes deliberately introduced intersymbol interference.

37. The apparatus of claim 23, wherein the path metric includes at least one term that represents intersymbol interference resulting from symbols of previously decoded codewords.

38. The apparatus of claim 37, further comprising means for determining the path metric in accordance with an iterative equation that computes a squared Euclidean distance between received symbols across one codeword of the received BCM signal and a term representing a sum of symbols of a BCM codeword corresponding to a state at stage k of the MLSE trellis and one or more symbols of one or more BCM codewords corresponding to a state at trellis stage (k−1).

39. The apparatus of claim 37, wherein the means for determining the path metric determines the path metric, $\Gamma_k^{(j)}$, in accordance with the equation:

$$\Gamma_k^{(j)} = \min_l \Bigg[ \Gamma_{k-1}^{(l)} + \sum_{i=1}^{N_{block}} |r(n_i+k) - c_1(n_i+k)s^{(j)}(n_i+k) - c_2(n_i+k)s^{(l)}(n_i+k-1) - c_3(n_i+k)\hat{s}^{(l)}(n_i+k-2)|^2 \Bigg],$$

where $r(n_i+k)$ are the received symbols across one codeword of the received BCM signal, $N_{block}$ is the block length of one BCM codeword, $s^{(j)}(n_i+k)$ are the symbols of the BCM codeword corresponding to state j at stage k of the MLSE trellis, $s^{(l)}(n_i+k-1)$ are the symbols of the BCM codeword corresponding to state l at stage (k−1) of the MLSE trellis, $\hat{s}^{(l)}(n_i+k-2)$ are the symbols of the tentative decisions for BCM codeword (k−2), obtained by tracing back from state l at stage (k−1) of the MLSE trellis, and $c_1(n_i+k)$, $c_2(n_i+k)$ and $c_3(n_i+k)$ are first, second and third coefficients of a channel impulse response estimate at time $n_i+k$.

40. The apparatus of claim 37, wherein the decoder advances the maximum likelihood sequence estimation trellis from one stage to the next stage in a forward direction, and wherein further the decoder advances the maximum likelihood sequence estimation trellis in a reverse direction.

41. The apparatus of claim 37, wherein the decoder advances the maximum likelihood sequence estimation trellis from one stage to the next stage in a backward direction.

42. The apparatus of claim 37, further comprising:
a memory for retaining a list of $N_s$ best previously decoded codewords, and
wherein the decoder operates on each of the $N_s$ best previously decoded codewords.

43. The apparatus of claim 37, further comprising means for determining the path metric in accordance with a function that includes a term corresponding to received signal samples at fractional symbol spacing and one or more terms that are proportional to channel impulse response coefficients at fractional symbol sampling locations.

44. The apparatus of claim 37, wherein the block coded modulation symbol sequence that has been received from the channel includes deliberately introduced intersymbol interference.

* * * * *

UNITED STATES PATENT AND TRADEMARK OFFICE
CERTIFICATE OF CORRECTION

PATENT NO. : 6,327,317 B1  Page 1 of 6
DATED : December 4, 2001
INVENTOR(S) : Sandeep Chennakeshu and Ravinder David Koilillai It is certified that error appears in the above-identified patent and that said Letters Patent is hereby corrected as shown below:

Column 3,
Between lines 41 and 50, please delete the equation and insert the following:

$$\Gamma_k^{(l)} = \min_{\ell} \left[ \Gamma_{k-1}^{(l)} + \sum_{i=1}^{N_{block}} \left| r(n_i + k) - c_1(n_i + k) s^{(l)}(n_i + k) - c_2(n_i + k) s^{(l)}(n_i + k - 1) \right|^2 \right]$$

Line 54, please delete "$s^{(I)}(n_i + k-1)$" and insert therefor -- $s^{(\ell)}(n_i + k-1)$ --.
Line 55, please delete "l" and insert therefor -- $\ell$ --.

Column 4,
Between lines 27 and 45, please delete the equation and insert the following:

$$\Gamma_k^{(l)} = \min_{\ell} \left[ \Gamma_{k-1}^{(l)} + \sum_{i=1}^{N_{block}} \left| r(n_i + k) - c_1(n_i + k) s^{(l)}(n_i + k) - c_2(n_i + k) s^{(l)}(n_i + k - 1) - c_3(n_i + k) s^{(l)}(n_i + k - 2) \right|^2 \right],$$

Line 49, please delete "$s^{(I)}(n_i + k-1)$" and insert therefor -- $s^{(\ell)}(n_i + k-1)$ --.
Line 50, please delete "l" and insert therefor -- $\ell$ --.
Line 51, please delete "$s^{(I)}(n_i + k-2)$" and insert therefor -- $s^{(\ell)}(n_i + k-2)$ --.
Line 53, please delete "P" and insert therefor -- $\ell$ --.
Line 66, please delete "Ns" and insert therefor -- $N_s$ --.

Column 6,
Line 60, please delete "$C(z) = c_1 + C_2 z^{31\ 1"}$" and insert therefor -- $C(z) = c_1 + C_2 z^{-1}$ --.

Column 9,
Line 59, please delete ""$(p_{(l)}(.), l=1,2,3$" and insert therefor -- $(p_{(\ell)}(.), \ell = 1,2,3$ --.

Column 11,
Between lines 3 and 10 please delete the equation and insert the following:

$$\left[ \{ s^{(1)}(n_1 + k - 1), s^{(1)}(n_2 + k - 1), s^{(1)}(n_3 + k - 1), s^{(1)}(n_4 + k - 1) \}, \right.$$

$$\{ s^{(2)}(n_1 + k - 1), s^{(2)}(n_2 + k - 1), s^{(2)}(n_3 + k - 1), s^{(2)}(n_4 + k - 1) \},$$

$$\vdots$$

$$\left. \{ s^{(N_p)}(n_1 + k - 1), s^{(N_p)}(n_2 + k - 1), s^{(N_p)}(n_3 + k - 1), s^{(N_p)}(n_4 + k - 1) \} \right].$$

(4)

UNITED STATES PATENT AND TRADEMARK OFFICE
CERTIFICATE OF CORRECTION

PATENT NO. : 6,327,317 B1
DATED : December 4, 2001
INVENTOR(S) : Sandeep Chennakeshu and Ravinder David Koilillai It is certified that error appears in the above-identified patent and that said Letters Patent is hereby corrected as shown below:

Column 11 cont'd,
Line 41, please delete "l" and insert therefore -- $\ell$ --.
Between lines 41 and 50, please delete the equation and insert the following:

$$\Gamma_k^{(l)} = \min_{\ell}\left[\Gamma_{k-1}^{(l)} + \sum_{i=1}^{N_{block}} \left|r(n_i+k) - c_1(n_i+k)s^{(l)}(n_i+k) - c_2(n_i+k)s^{(l)}(n_i+k-1)\right|^2\right] \quad (5)$$

Line 51, please delete "s$^{(1)}$(n$_i$ + k-1)" and insert therefor -- s$^{(\ell)}$(n$_i$ + k-1) --.
Line 52, please delete "l" and insert therefor -- $\ell$ --.
Line 57, please delete "s$^{(l)}$(n$_i$ + k-1)" and insert therefor -- s$^{(\ell)}$(n$_i$ + k-1) --. .

Column 12,
Line 42, please delete "l" and insert therefor -- $\ell$ --.
Between lines 43 and 50, please delete the equation and insert the following:

$$\Gamma_k^{(l)} = \min_{\ell}\left[\Gamma_{k-1}^{(l)} + \sum_{i=1}^{N_{block}} \left|r(n_i+k) - c_1(n_i+k)s^{(l)}(n_i+k) - c_2(n_i+k)s^{(l)}(n_i+k-1) - c_3(n_i+k)s^{(l)}(n_i+k-2)\right|^2\right], \quad (6)$$

Line 53, please delete "s$^{(1)}$(n$_i$ + k-1)" and insert therefor -- s$^{(\ell)}$(n$_i$ + k-1) --.
Line 54, please delete "l" and insert therefor -- $\ell$ --.
Line 55, please delete "s$^{(1)}$(n$_i$ + k-1)" and insert therefor -- ŝ$^{(\ell)}$(n$_i$ + k-1) --.
Line 56, please delete "l" and insert therefor -- $\ell$ --.

Column 14,
Please delete lines 19-56, and insert the following:

$$\Gamma_{k,f}^{(l)} = \min_{l}\left[\Gamma_{k-1,f}^{(l)} + \sum_{i=1}^{N_{block}} \left|r(n_i+k) - c_1(n_i+k)s^{(l)}(n_i+k) - c_2(n_i+k)s^{(l)}(n_i+k-1)\right|^2\right]$$

MLSE backward decoding is in accordance with $$\Gamma_{k,b}^{(l)} = \min_{l}\left[\Gamma_{k-1,b}^{(l)} + \sum_{i=1}^{N_{block}} \left|r(n_i+k+1) - c_1(n_i+k+1)s^{(l)}(n_i+k+1) - c_2(n_i+k+1)s^{(l)}(n_i+k)\right|^2\right]$$

UNITED STATES PATENT AND TRADEMARK OFFICE
CERTIFICATE OF CORRECTION

| | | |
|---|---|---|
| PATENT NO. | : 6,327,317 B1 | Page 3 of 6 |
| DATED | : December 4, 2001 | |
| INVENTOR(S) | : Sandeep Chennakeshu and Ravinder David Koilillai | |

It is certified that error appears in the above-identified patent and that said Letters Patent is hereby corrected as shown below:

For the case of hybrid decoding, forward decoding proceeds in accordance with:
Backward hybrid decoding is in accordance with:

$$\Gamma_{k,f}^{(l)} = \min_l \left[ \Gamma_{k-1,f}^{(l)'} + \sum_{i=1}^{N_{block}} |r(n_i+k) - c_1(n_i+k)s^{(l)}(n_i+k) - c_2(n_i+k)s^{(l)}(n_i+k-1) - c_3(n_i+k)\hat{s}(n_i+k-2)|^2 \right]$$

$$\Gamma_{k,b}^{(l)} = \min_l \left[ \Gamma_{k+1,b}^{(l)} + \sum_{i=1}^{N_{block}} |r(n_i+k+2) - c_1(n_i+k+2)\hat{s}(n_i+k+2) \right.$$
$$\left. -c_2(n_i+k+2)s^{(l)}(n_i+k+1) - c_3(n_i+k+2)s^{(l)}(n_i+k)|^2 \right]$$

<u>Column 15,</u>
Please delete lines 55-67, and insert the following:

$$\Gamma_{k,f}^{(l)} = \min_l \left[ \Gamma_{k-1,f}^{(l)} + \right.$$
$$\left\{ |r(n_i+k) - c_1(n_i+k)s^{(l)}(n_i+k) - c_2(n_i+k)s^{(l)}(n_i+k-1) - c_3(n_i+k)s^{(l)}(n_i+k-2)|^2 + \right.$$
$$\left. \left. |r(n_i+k-\frac{1}{2}) - c_1'(n_i+k)s^{(l)}(n_i+k) - c_2'(n_i+k)s^{(l)}(n_i+k-1) - c_3'(n_i+k)s^{(l)}(n_i+k-2)|^2 \right\} \right]$$

The fractionally spaced hybrid technique would use the following metric:

$$\Gamma_{k,f}^{(l)} = \min_l \left[ \Gamma_{k-1,f}^{(l)} + \right.$$
$$\left\{ |r(n_i+k) - c_1(n_i+k)s^{(l)}(n_i+k) - c_2(n_i+k)s^{(l)}(n_i+k-1) - c_3(n_i+k)\hat{s}(n_i+k-2)|^2 + \right.$$
$$\left. \left. |r(n_i+k-\frac{1}{2}) - c_1'(n_i+k)s^{(l)}(n_i+k) - c_2'(n_i+k)s^{(l)}(n_i+k-1) - c_3'(n_i+k)\hat{s}(n_i+k-2)|^2 \right\} \right]$$

UNITED STATES PATENT AND TRADEMARK OFFICE
CERTIFICATE OF CORRECTION

PATENT NO. : 6,327,317 B1
DATED : December 4, 2001
INVENTOR(S) : Sandeep Chennakeshu and Ravinder David Koilillai It is certified that error appears in the above-identified patent and that said Letters Patent is hereby corrected as shown below:

Column 17, line 59 - Column 18, lines 1-22,
Delete and replace it with the following:
-- 10. The method of claim 1,
wherein the BCM symbol sequence is determined by an interleaver having $N_{block}$ columns and a number of rows, and
wherein the path metric, $\Gamma_k^{(j)}$ for a transition in the maximum likelihood sequence estimation trellis from state $\ell$ at trellis stage (k-1) to state $j$ at trellis stage k is determined in accordance with the equation:

$$\Gamma_k^{(j)} = \min_{\ell} \left[ \Gamma_{k-1}^{(\ell)} + \sum_{i=1}^{N_{block}} \left| r(n_i+k) - c_1(n_i+k)s^{(j)}(n_i+k) - c_2(n_i+k)s^{(\ell)}(n_i+k-1) \right|^2 \right]$$

where $\ell$ is a variable that takes on values covering all possible states at trellis stage (k-1),
$n_i$ is a time instant at which a first BCM codeword symbol associated with column $i$ of the interleaver is received,
$r(n_i + k)$ are the received symbols corresponding to a BCM codeword, $N_{block}$ is the block length of one BCM codeword, $s^{(j)}(n_i + k)$ are the symbols of a candidate BCM codeword for the codeword being currently decoded, $s^{(\ell)}(n_i + k-1)$ are the symbols of the BCM codeword corresponding to state $\ell$ in the previous MLSE trellis stage, and $c_1(n_i + k)$ and $c_2(n_i + k)$ are first and second coefficients of a channel impulse response estimate at time $n_i + k$ . --

Column 18, lines 54-67 - Column 19, lines 1-12,
Delete, and replace it with the following:
-- 17. The method of claim 15, wherein the path metric, $\Gamma_k^{(j)}$ is determined in accordance with the equation:

$$\Gamma_k^{(j)} = \min_{\ell} \left[ \Gamma_{k-1}^{(\ell)} + \sum_{i=1}^{N_{block}} \left| r(n_i+k) - c_1(n_i+k)s^{(j)}(n_i+k) - c_2(n_i+k)s^{(\ell)}(n_i+k-1) - c_3(n_i+k)s^{(\ell)}(n_i+k-2) \right|^2 \right],$$

UNITED STATES PATENT AND TRADEMARK OFFICE
CERTIFICATE OF CORRECTION

PATENT NO. : 6,327,317 B1
DATED : December 4, 2001
INVENTOR(S) : Sandeep Chennakeshu and Ravinder David Koilillai It is certified that error appears in the above-identified patent and that said Letters Patent is hereby corrected as shown below:

where $\ell$ is a variable that takes on values covering all possible states at trellis stage (k-1), $r(n_i + k)$ are the received symbols across one codeword of the received BCM signal, $N_{block}$ is the block length of one BCM codeword, $s^{(j)}(n_i + k)$ are the symbols of the BCM codeword corresponding to state j at stage k of the MLSE trellis, $s^{(\ell)}(n_i + k-1)$ the symbols of the BCM codeword corresponding to state $\ell$ at stage (k-1) of the MLSE trellis, $\hat{s}^{(\ell)}(n_i + k-2)$ are the symbols of the tentative decisions for BCM codeword (k - 2), obtained by tracing back from state $\ell$ at stage (k-1) of the MLSE trellis, and $c_i(n_i + k)$, $c_2(n_i + k)$ and $c_3(n_i + k)$ are first, second and third coefficients of a channel impulse response estimate at time $n_i + k$. --

Column 20, lines 54-67 - Column 21, lines 1-18,
Delete and replace it with the following:
-- 32. The apparatus of claim 23,
wherein the BCM symbol sequence is determined by an interleaver having $N_{block}$ columns and a number of rows, and
further comprising means for determining the path metric, $\Gamma_k^{(j)}$ for a transition in the maximum likelihood sequence estimation trellis from state $\ell$ at trellis stage (k-1) to state $j$ at trellis stage k, in accordance with the equation:

$$\Gamma_k^{(j)} = \min_{\ell} \left[ \Gamma_{k-1}^{(\ell)} + \sum_{l=1}^{N_{block}} \left| r(n_l+k) - c_1(n_l+k)s^{(j)}(n_l+k) - c_2(n_l+k)s^{(\ell)}(n_l+k-1) \right|^2 \right]$$

where $\ell$ is a variable that takes on values covering all possible states at trellis stage (k-1), $n_i$ is a time instant at which a first BCM codeword symbol associated with column $_i$ of the interleaver is received,
$r(n_i + k)$ are the received symbols corresponding to a BCM codeword, $N_{block}$ is the block length of one BCM codeword, $s^{(j)}(n_i + k)$ are the symbols of a candidate BCM codeword for the codeword being currently decoded, $s^{(\ell)}(n_i + k-1)$ are the symbols of the BCM codeword corresponding to state $\ell$ in the previous MLSE trellis stage, and $c_i(n_i + k)$, $c_2(n_i + k)$ are first and second coefficients of a channel impulse response estimate at time $n_i + k$. --

UNITED STATES PATENT AND TRADEMARK OFFICE
CERTIFICATE OF CORRECTION

PATENT NO. : 6,327,317 B1
DATED : December 4, 2001
INVENTOR(S) : Sandeep Chennakeshu and Ravinder David Koilillai It is certified that error appears in the above-identified patent and that said Letters Patent is hereby corrected as shown below:

<u>Column 22,</u>
Lines 1-23, delete and replace it with the following:
-- 39. The apparatus of claim 37, wherein the means for determining the path metric determines the path metric, $\Gamma_k^{(j)}$ in accordance with the equation:

$$\Gamma_k^{(j)} = \min_\ell \left[ \Gamma_{k-1}^{(\ell)} + \sum_{l=1}^{N_{block}} \left| r(n_l+k) - c_1(n_l+k)s^{(j)}(n_l+k) - c_2(n_l+k)s^{(\ell)}(n_l+k-1) - c_3(n_l+k)\hat{s}^{(\ell)}(n_l+k-2) \right|^2 \right],$$

where $r(n_i + k)$ are the received symbols across one codeword of the received BCM signal, $N_{block}$ is the block length of one BCM codeword, $s^{(j)}(n_i+k-1)$ are the symbols of the BCM codeword corresponding to state j at stage k of the MLSE trellis, $s^{(\ell)}(n_i+ k-1)$ are the symbols of the BCM codeword corresponding to state $\ell$ at stage (k-1) of the MLSE trellis, $\hat{s}^{(\ell)}(n_i + k-2)$ are the symbols of the tentative decisions for BCM codeword (k - 2), obtained by tracing back from state $\ell$ at stage (k-1) of the MLSE trellis, and $c_i(n_i + k)$, $c_2(n_i + k)$ and $c_3(n_i + k)$ are first, second and third coefficients of a channel impulse response estimate at time $n_i + k$. --

Signed and Sealed this

Twenty-seventh Day of August, 2002

*Attest:*

*Attesting Officer*

JAMES E. ROGAN
*Director of the United States Patent and Trademark Office*